(12) United States Patent
Hamada

(10) Patent No.: US 6,813,399 B2
(45) Date of Patent: Nov. 2, 2004

(54) OPTICAL DEVICE

(75) Inventor: Hidenobu Hamada, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 228 days.

(21) Appl. No.: 10/071,617

(22) Filed: Feb. 8, 2002

(65) Prior Publication Data
US 2002/0110306 A1 Aug. 15, 2002

(30) Foreign Application Priority Data

Feb. 9, 2001 (JP) ........................................ 2001-034088
Apr. 3, 2001 (JP) ........................................ 2001-104122

(51) Int. Cl.[7] .............................................. G02B 6/00
(52) U.S. Cl. ............................. 385/11; 385/31; 385/37; 385/49; 385/129
(58) Field of Search ............................. 385/11, 15, 31, 385/37, 49, 129

(56) References Cited

U.S. PATENT DOCUMENTS

| | | | |
|---|---|---|---|
| 5,998,298 A | 12/1999 | Fleming et al. | |
| 6,188,819 B1 * | 2/2001 | Kosaka et al. | 385/39 |
| 6,317,554 B1 | 11/2001 | Kosaka et al. | |
| 6,621,644 B2 | 9/2003 | Tokushima | |
| 2001/0026659 A1 * | 10/2001 | Sekine et al. | 385/40 |
| 2003/0169787 A1 | 9/2003 | Aldaz et al. | |
| 2003/0174961 A1 | 9/2003 | Hamada | |

FOREIGN PATENT DOCUMENTS

| | | |
|---|---|---|
| JP | 11-271541 A | 10/1999 |
| JP | 2000-56146 A | 2/2000 |
| JP | 2000-180789 | 6/2000 |
| JP | 2000-224109 A | 8/2000 |
| JP | 2000-232258 A | 8/2000 |
| JP | 2000-241762 | 9/2000 |
| JP | 2000-241763 | 9/2000 |
| JP | 2000-284225 | 10/2000 |
| JP | 2001-13439 A | 1/2001 |
| JP | 2001-51122 A | 2/2001 |
| JP | 2001-74954 A | 3/2001 |

OTHER PUBLICATIONS

"Photonic–Crystal Slabs with a Small Variation in Refractive Index and Application to Optical Functional Devices" by Hidenobu Hamada (Technical Report of IEICE (The Institute of Electronics, Information and Communication Engineers) OPE 2001–107 (2001–107 (2001–12), pp. 19–24).

* cited by examiner

Primary Examiner—Hemang Sanghavi
Assistant Examiner—Sung Pak
(74) Attorney, Agent, or Firm—Merchant & Gould P.C.

(57) ABSTRACT

The invention provides a small optical device with which incident light can be demultiplexed. The optical device includes a demultiplexing portion 4 (first optical member) separating TE waves and TM waves of incident light of a wavelength $\lambda$ and an optical fiber 1 (optical input portion) inputting incident light into the demultiplexing portion 4. The demultiplexing portion 4 has a periodically changing refractive index. The angle defined by the first reciprocal lattice vector $\alpha_1$ and the second reciprocal lattice vector $\alpha_2$ of the demultiplexing portion 4 at the wavelength $\lambda$ is not greater than 90°. In the direction of the first reciprocal lattice vector $\alpha_1$ the wave number of the TE wave is larger than the wave number of the TM wave. In the direction of the second reciprocal lattice vector $\alpha_2$ the wave number of the TE wave is smaller than the wave number of the TM wave. The optical fiber 1 inputs the incident light in a direction that is parallel to a plane including the first reciprocal lattice vector $\alpha_1$ and the second reciprocal lattice vector $\alpha_2$.

38 Claims, 22 Drawing Sheets

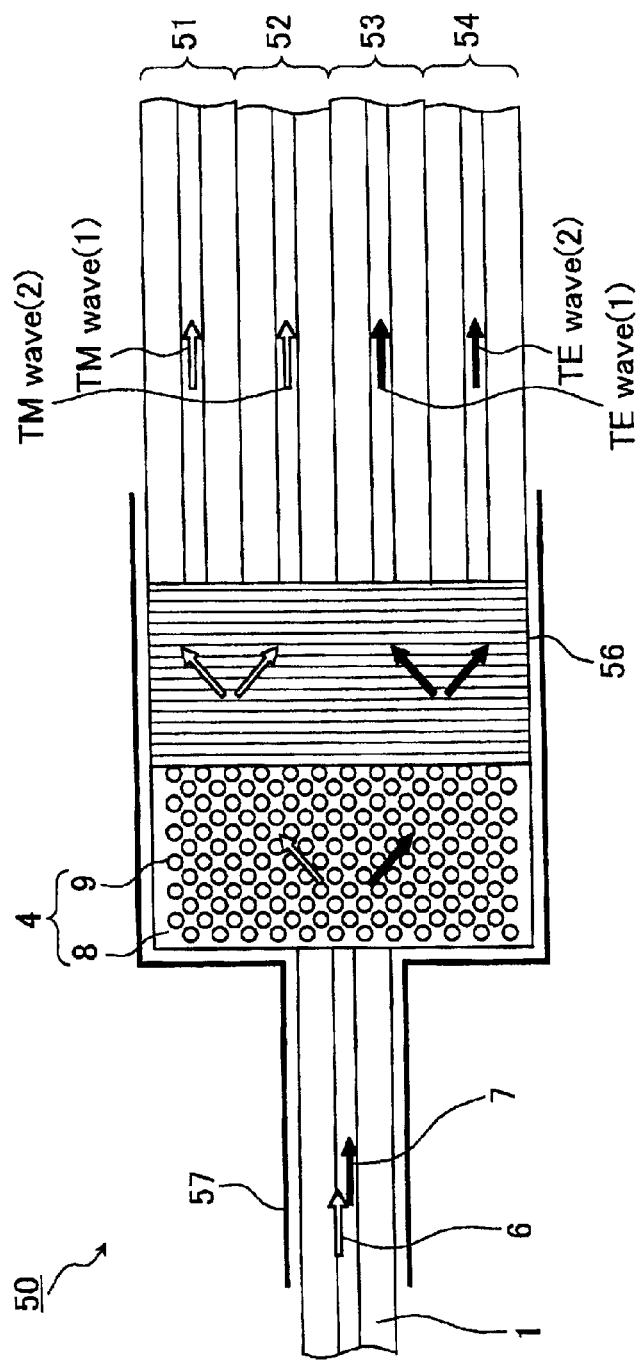
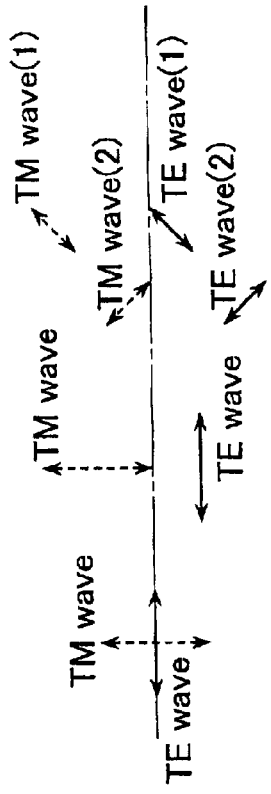
FIG. 5A
FIG. 5B

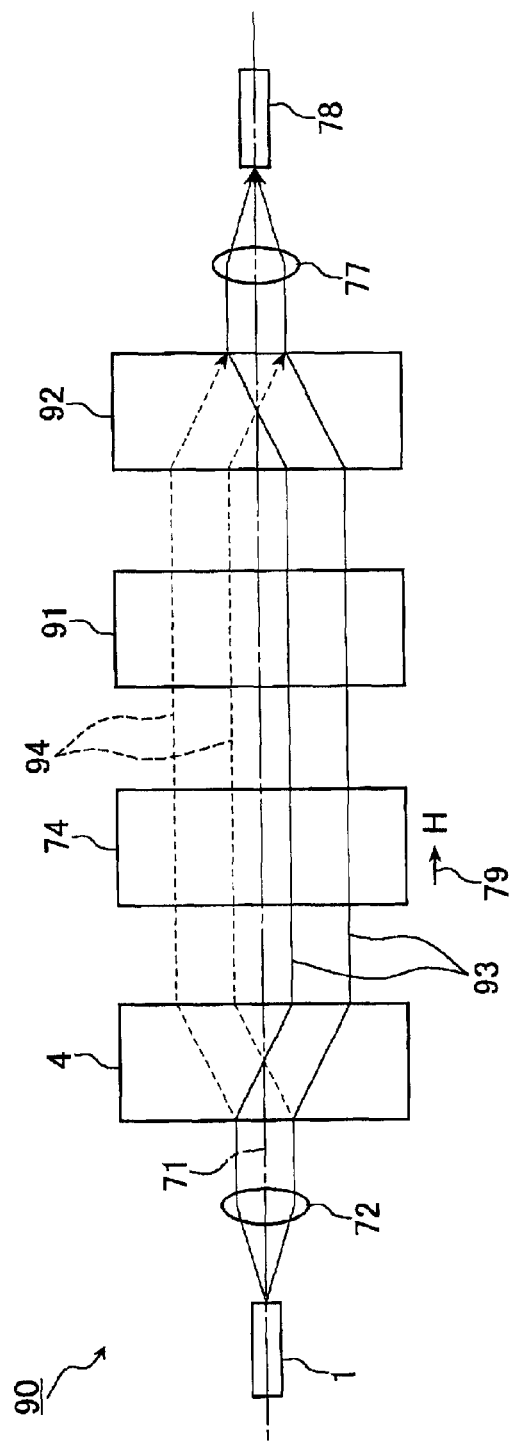
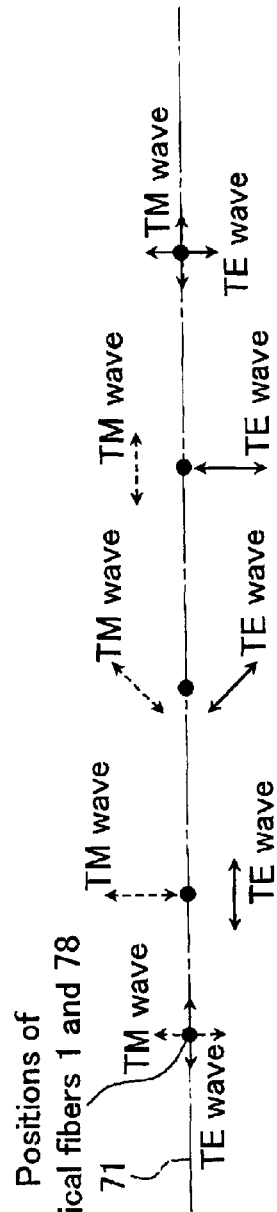
FIG. 9A
FIG. 9B

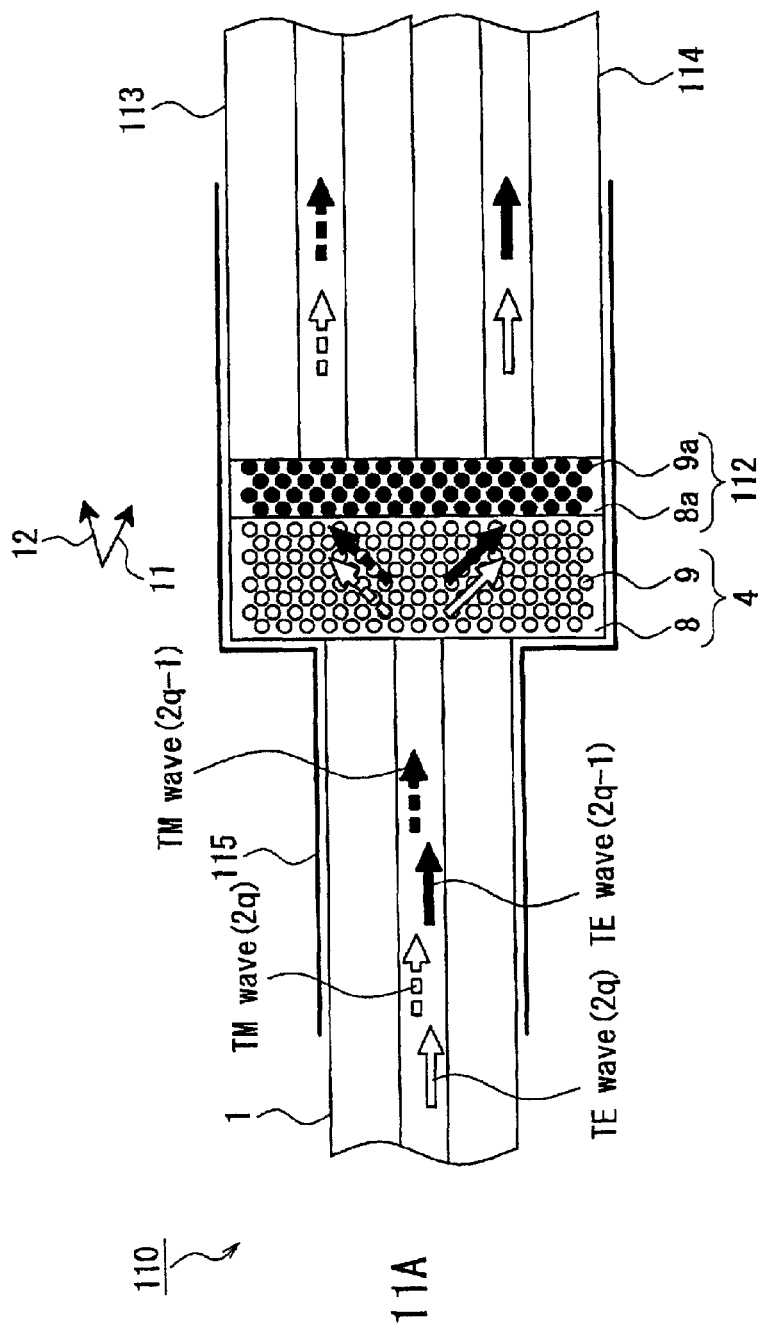
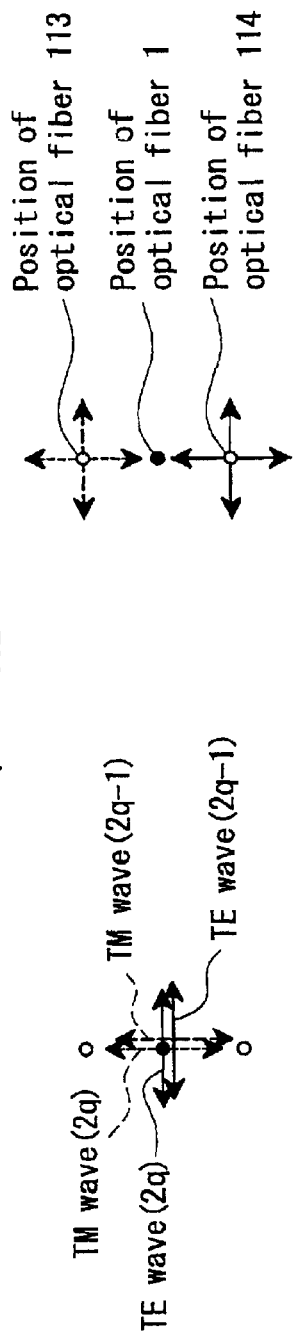

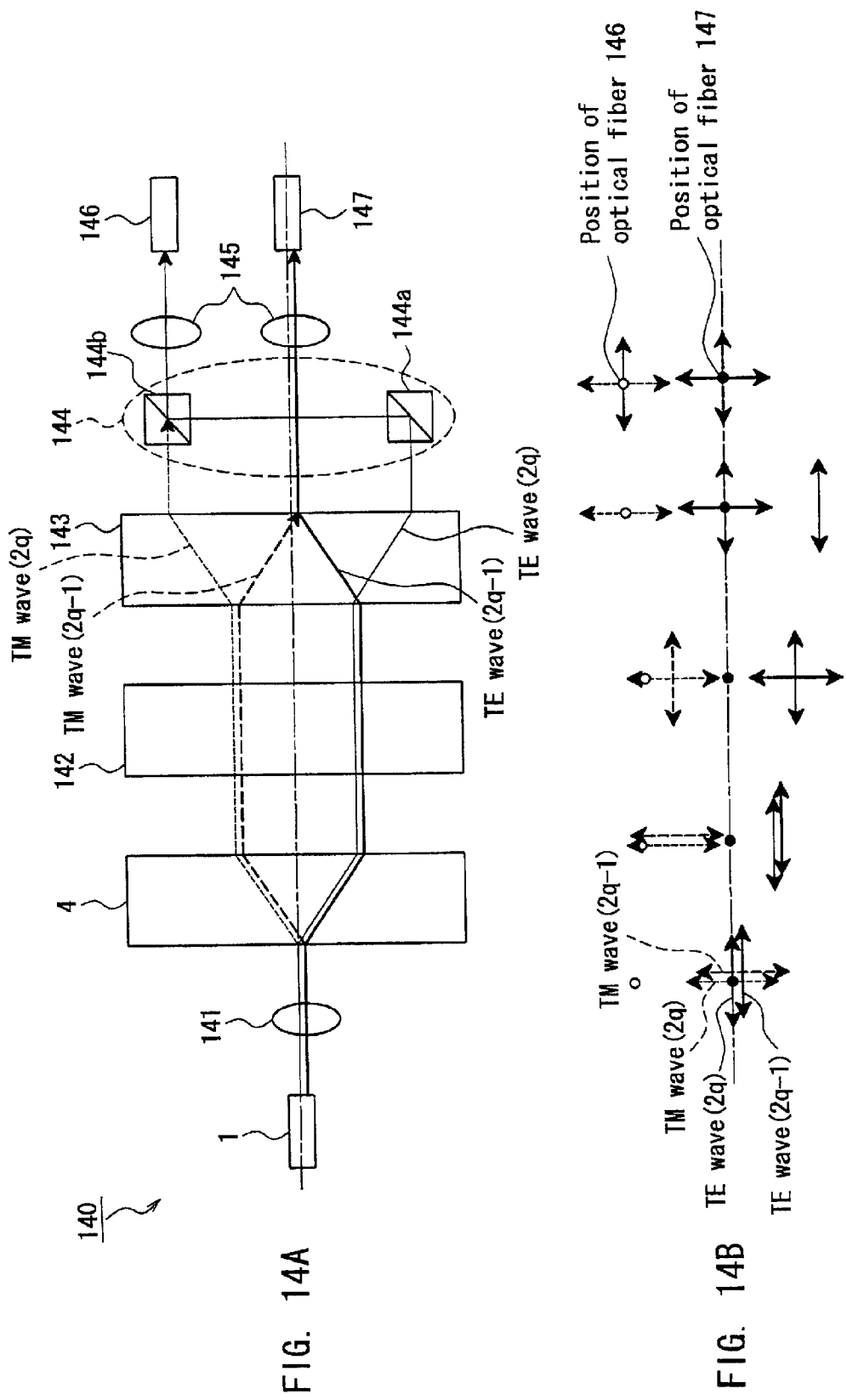

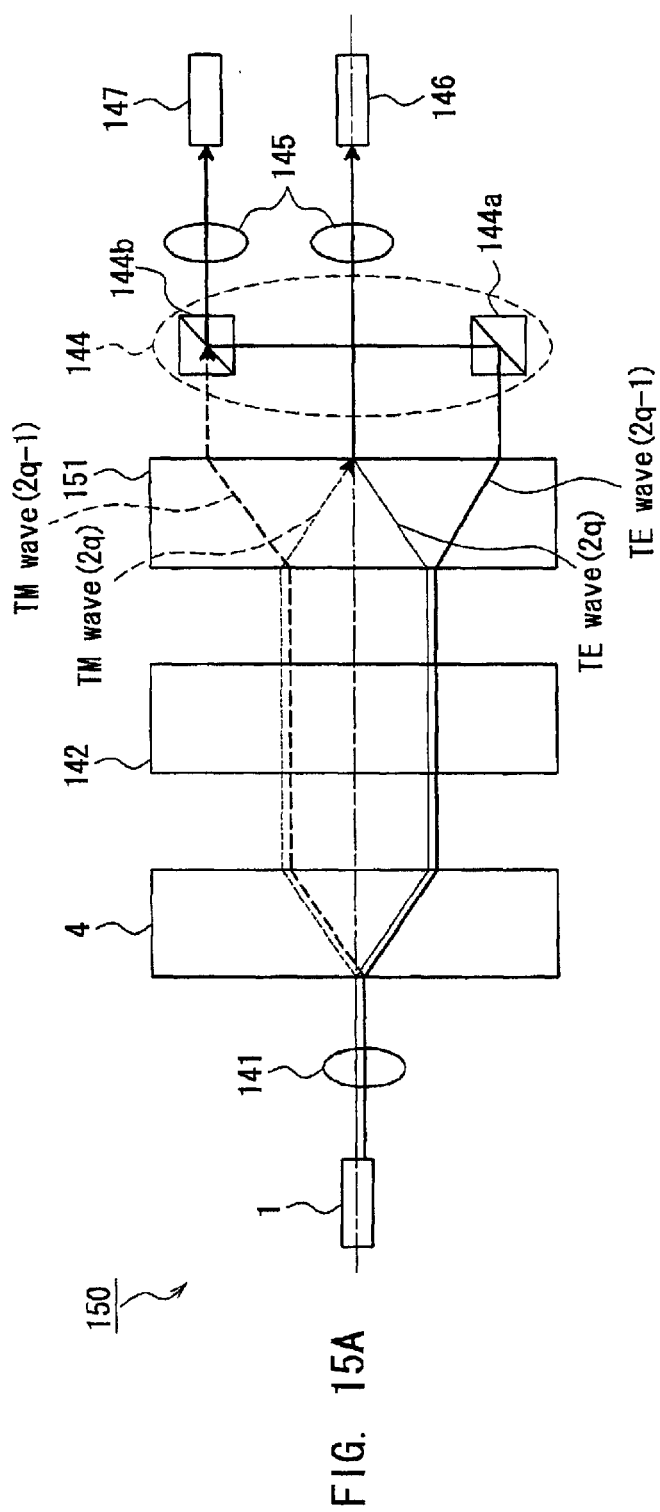
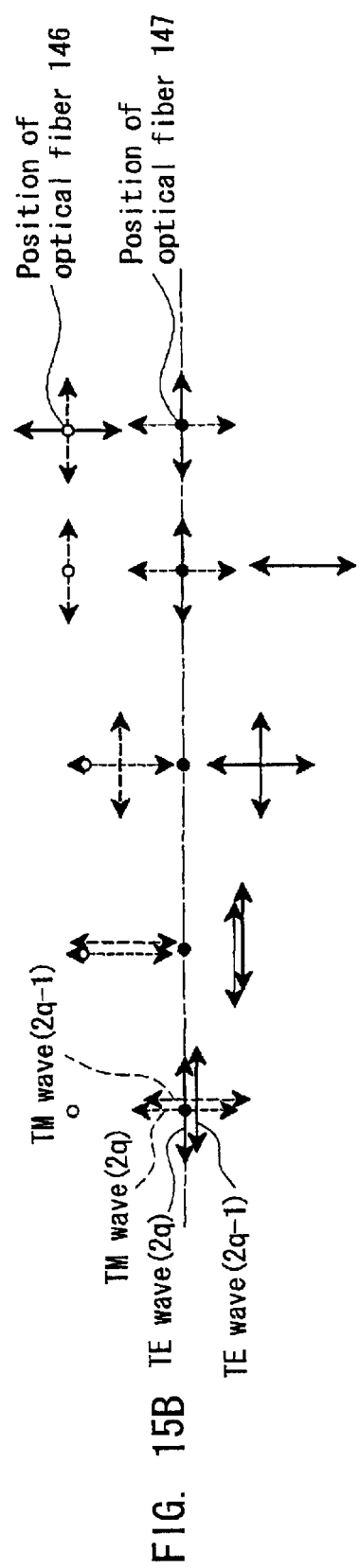
FIG. 15A
FIG. 15B

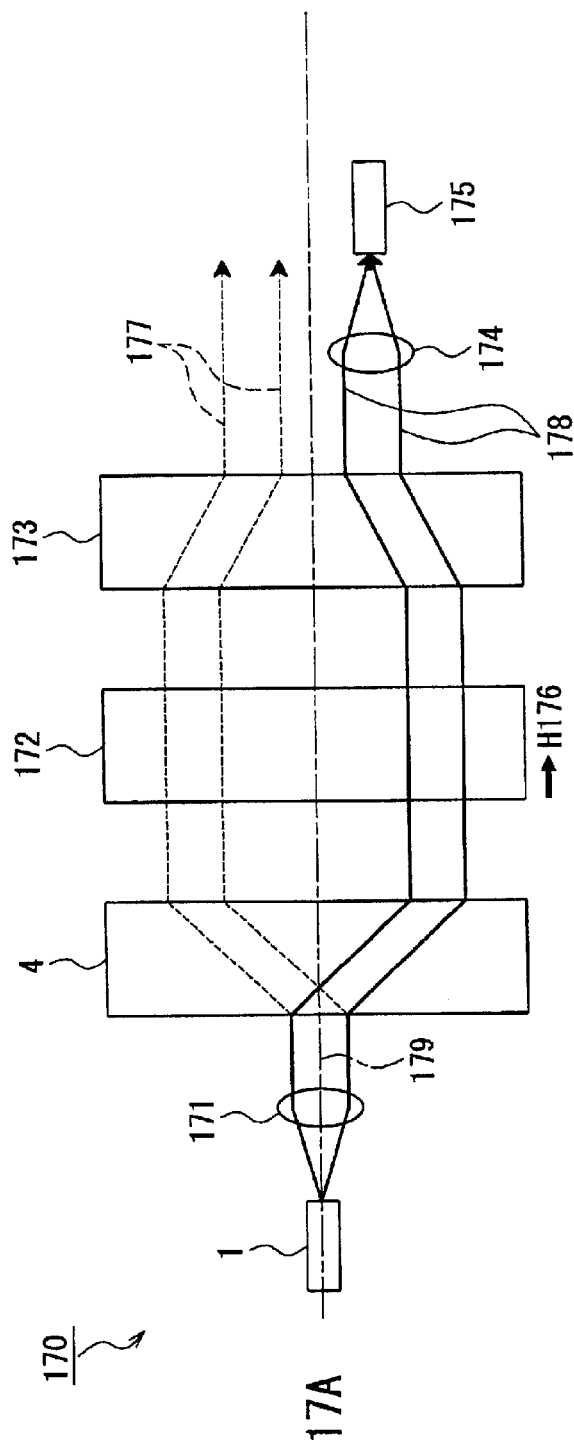
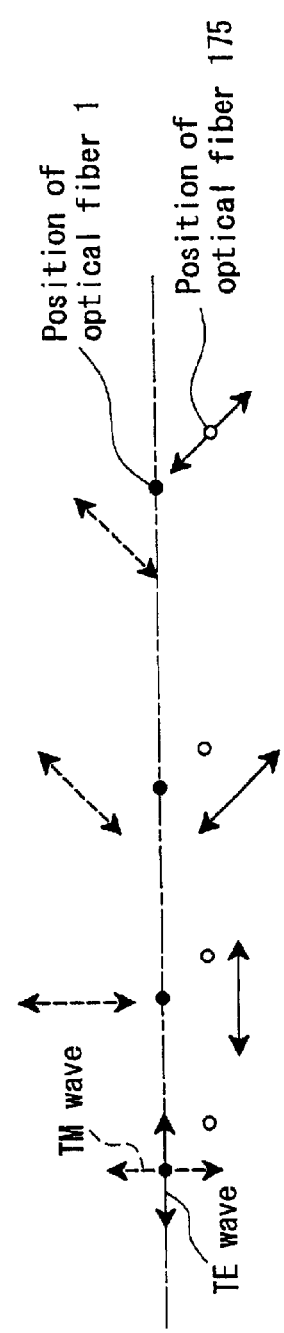
FIG. 17A
FIG. 17B

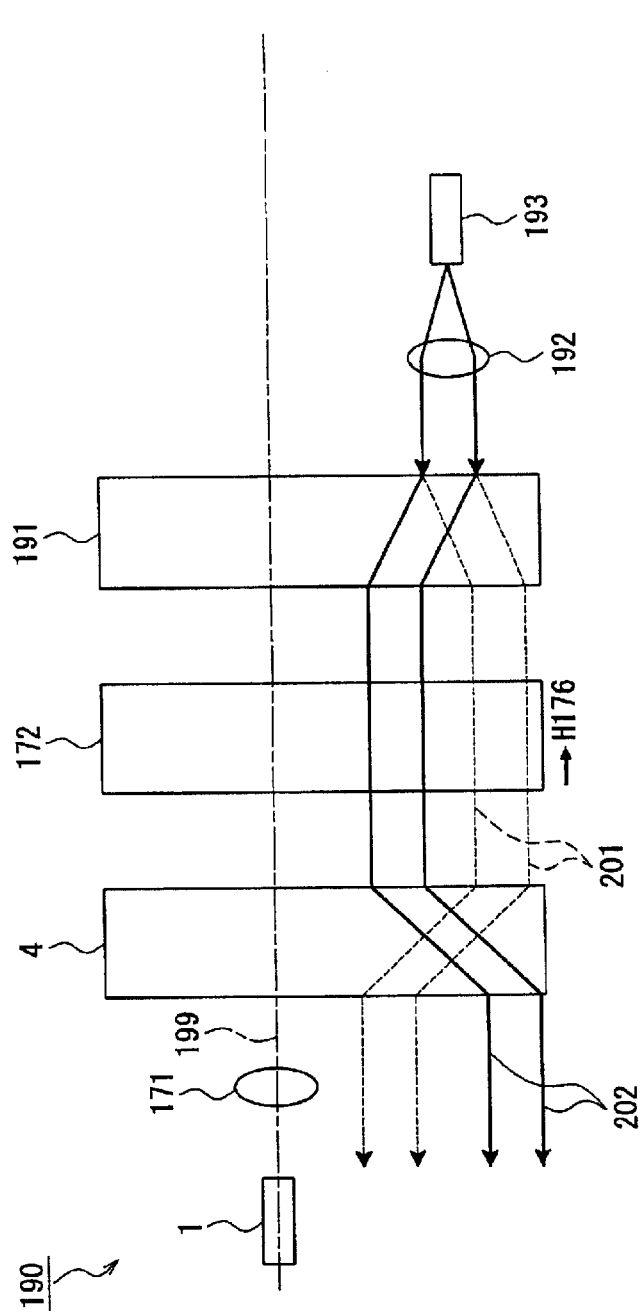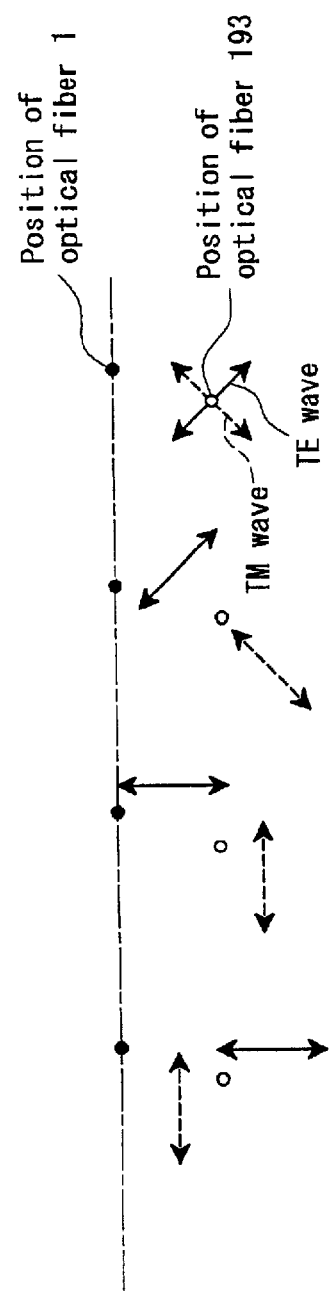
FIG. 20A
FIG. 20B

OPTICAL DEVICE

BACKGROUND OF THE INVENTION

1. Field of the Invention

The present invention relates to optical devices, and more particularly, to optical devices such as optical interleavers and polarization-dependent optical isolators used for WDM (wavelength division multiplexing) optical communication.

2. Related Background Art

FIG. 21 shows an example of a conventional optical demultiplexer 900 made of a natural birefringent material, such as rutile. The demultiplexer 900 includes an ingoing optical fiber 901, an ingoing lens 902, a birefringent material 903 such as rutile, a first outgoing lens 904, a first outgoing optical fiber 905, a second outgoing lens 906, and a second outgoing optical fiber 907. Incident light that is coupled from the ingoing optical fiber 901 through the ingoing lens 902 into the birefringent material 903 is separated into ordinary light (TE wave) 909 and extraordinary light (TM wave) 908. The ordinary light 909 and the extraordinary light 908, which are separated by a distance proportional to the length of the birefringent material 903, are then coupled by the outgoing side lenses into the first outgoing optical fiber 905 and the second outgoing fiber 907.

Natural birefringent materials, such as rutile, have a polarization-dispersion surface (refractive index ellipsoid) as shown in FIG. 22. For this reason, the light that is incident on the birefringent material 903 propagates in directions perpendicular to the dispersion surface of the ordinary light and to the dispersion surface of the extraordinary light, in accordance with the law of conservation of momentum.

However, the difference between the dispersion surface of ordinary light and the dispersion surface of extraordinary light for natural birefringent materials such as rutile is small, and consequently, the separation angle of ordinary and extraordinary light is small as well. Therefore, the length of the birefringent material has to be long, so that the demultiplexer 900 becomes large.

On the other hand, optical devices using photonic crystals in which the refractive index changes periodically have been proposed (see JP 2000-180789A, JP 2000-241762A, JP 2000-241763A and JP 2000-284225A). It should be noted that throughout this specification, "photonic crystal" means an artificial multi-dimensionally periodic structure having a periodicity of the same order as the wavelength of light.

Conventional optical isolators that use photonic crystals as polarizers use photonic crystals having a photonic band structure in which either TE waves or TM waves are reflected at the ingoing plane. Therefore, the photonic crystal is tilted from the optical axis such that the reflected light (returning light) from the photonic crystal is not coupled into the light-source side. Such an optical isolator reflects light that is incident light from the light-source side, so that a separate optical system or optical design is necessary to make sure that the reflected light is not coupled into the light-source side, which makes the structure more complicated.

In view of these problems, it is an object of the present invention to provide a small optical device, with which incident light can be demultiplexed.

SUMMARY OF THE INVENTION

In order to achieve the object of the present invention, an optical device (CL1) according to the present invention includes a first optical member separating an incident light of wavelength $\lambda$ into TE wave and TM wave; and an optical input portion, which inputs the incident light into the first optical member; wherein the first optical member has a periodically changing refractive index; wherein an angle defined by a first reciprocal lattice vector $\alpha_1$ and a second reciprocal lattice vector $\alpha_2$ of the first optical member at the wavelength $\lambda$ is not larger than 90°; wherein, in the direction of the first reciprocal lattice vector $\alpha_1$, the wave number of the TE wave is larger than the wave number of the TM wave; wherein, in the direction of the second reciprocal lattice vector $\alpha_2$, the wave number of the TE wave is smaller than the wave number of the TM wave; and wherein the optical input portion inputs the incident light in a direction that is parallel to a plane $P_{12}$ including the first reciprocal lattice vector $\alpha_1$ and the second reciprocal lattice vector $\alpha_2$. With this optical device, the difference between the dispersion surfaces of the TE waves and the TM waves in the demultiplexing portion becomes large, and the separation angle of the TE waves and the TM waves can be set to be large. As a result, it is possible to separate TE waves and TM waves at a propagation distance at which the influence of diffraction can be ignored, and it is possible to reduce the number of optical parts, such as lenses, and to make the device smaller.

Furthermore, another optical device (CL6) of the present invention includes, in addition to this optical device (CL1), a phase retarder and an optical output portion; wherein the first optical member, the phase retarder and the optical output portion are arranged such that light that enters from the optical input portion is transmitted in that order; wherein the optical input portion inputs a plurality of p light beams (wherein p is an integer), whose wavelengths range from a wavelength $\lambda(1)$ equal to $\lambda$ and increase at constant wavelength intervals to a wavelength $\lambda(p)$, in a direction that is parallel to the plane $P_{12}$; and wherein the phase retarder imparts a difference in polarization between light beams of odd-numbered wavelengths and light beams of even-numbered wavelengths. With this optical device, the first optical member and a phase retarder imparting a constant polarization difference between odd-numbered wavelengths and even-numbered wavelengths are integrated into one optical device. Therefore, combining two kinds of polarizations and two kinds of wavelengths (odd-numbered wavelengths and even-numbered wavelengths), this optical device can be applied for devices with a variety of functions. This optical device is particularly preferable for WDM optical communication with light of a plurality of wavelengths that are separated by a constant wavelength interval.

BRIEF DESCRIPTION OF THE DRAWINGS

FIG. 5A schematically illustrates another configuration of the optical device of the present invention, and FIG. 5B schematically illustrates the polarization state of light therein.

FIG. 9A schematically illustrates yet another configuration of the optical device of the present invention, and FIG. 9B schematically illustrates the polarization state of forward light therein.

FIG. 11A schematically illustrates yet another configuration of the optical device of the present invention, and FIG. 11B schematically illustrates the polarization state of forward light therein.

FIG. 14A schematically illustrates yet another configuration of the optical device of the present invention, and FIG. 14B schematically illustrates the polarization state of light therein.

FIG. 15A schematically illustrates yet another configuration of the optical device of the present invention, and FIG. 15B schematically illustrates the polarization state of light therein.

FIG. 17A schematically illustrates yet another configuration of the optical device of the present invention, and FIG. 17B schematically illustrates the polarization state of forward light therein.

FIG. 20A schematically illustrates the light path of return light, and FIG. 20B schematically illustrates the polarization state of return light in the optical device shown in FIG. 19A.

PREFERRED EMBODIMENTS OF THE INVENTION

The following is an explanation of preferred embodiments of the present invention, with reference to the accompanying drawings. It should be noted that in the explanation of the following embodiments, like parts have been denoted by like numerals, and duplicate explanations have been omitted.

Embodiment 1

Figure 1:
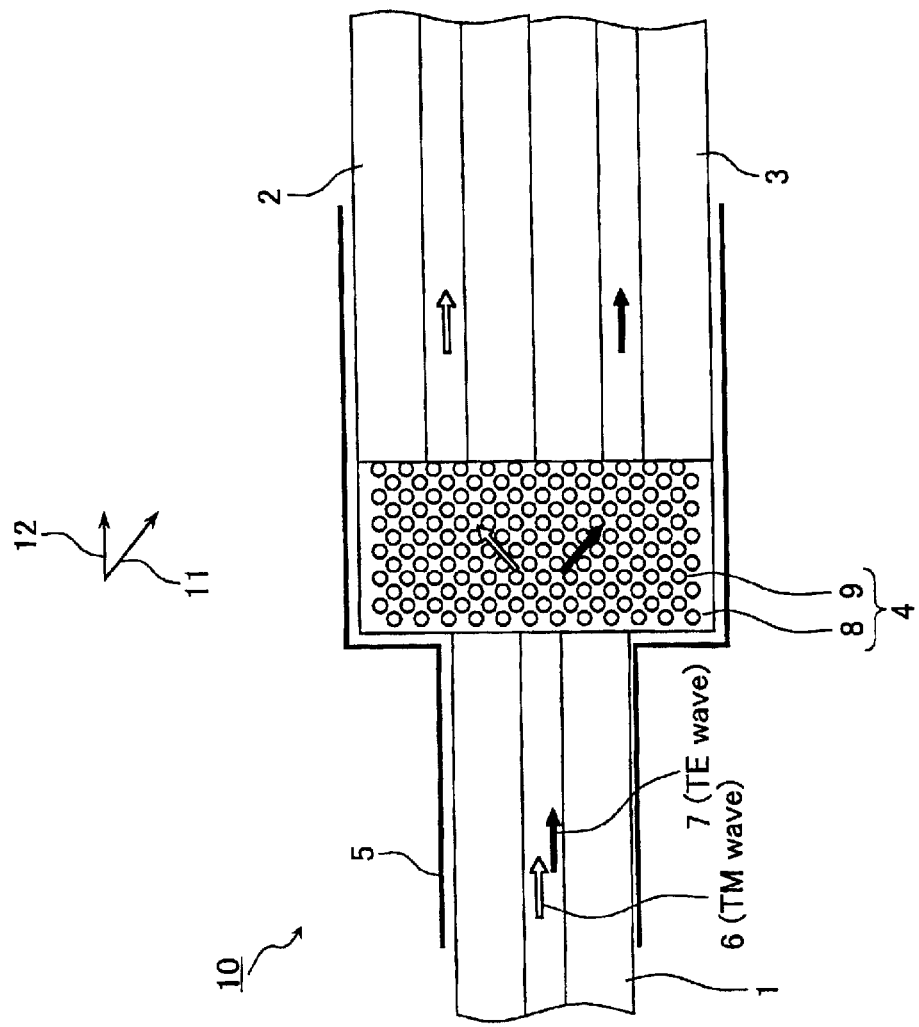
FIG. 1 schematically illustrates the configuration and function of an optical device according to the present invention.

Embodiment 1 illustrates a demultiplexer as an example of an optical device according to the present invention. FIG. 1 schematically illustrates the configuration of an optical device 10 according to Embodiment 1. It should be noted that hatching lines have been omitted from Figures.

The optical device 10 includes an optical fiber 1 (F(0)) on the ingoing side, optical fibers 2 and 3 (F(1) and F(2)) on the outgoing side, a demultiplexing portion 4, and a guide 5. The guide 5 fixes the relative positions of the optical fibers 1 to 3 and the demultiplexing portion 4. The optical fibers 1 to 3 each include a core portion through which light propagates, and a cladding portion disposed around the core portion.

The demultiplexing portion 4 (also referred to as "first demultiplexing portion 4" in the following embodiments) is an optical member (first optical member) separating incident light of a wavelength λ into a TE wave (ordinary light) and a TM wave (extraordinary light). The demultiplexing portion 4 includes a first material 8 (base material) having an ingoing plane and an outgoing plane that are parallel to one another, and a plurality of columnar portions 9 arranged inside the first material 8. The columnar portions 9 are made of a second material whose refractive index is different from that of the first material. The center axes of the columnar portions 9 are parallel to one another, but perpendicular to the incidence direction of incident light. That is to say, the columnar portions 9 are arranged such that their center axes are parallel to the ingoing plane of the first material 8. The plurality of columnar portions 9 are arranged periodically with a constant period, so that the refractive index of the demultiplexing portion 4 changes periodically. If the light-source wavelength is 1.3 μm, then the period at which the columnar portions 9 are arranged can be, for example, 0.2 to 1.0 μm. The angle defined by the direction (K) 11 of a first reciprocal lattice vector $\alpha_1$ and the direction (M) 12 of a second reciprocal lattice vector $\alpha_2$ at the wavelength λ in the demultiplexing portion 4, which has a plurality of lattice vectors, is not greater than 90° (preferable at least 45° and at most 90°). Furthermore, in the direction (K) 11 of the first reciprocal lattice vector $\alpha_1$, the wave number of TE waves is larger than the wave number of TM waves. And in the direction (M) 12 of the second reciprocal lattice vector $\alpha_2$, the wave number of TE waves is smaller than the wave number of TM waves.

Figure 2:
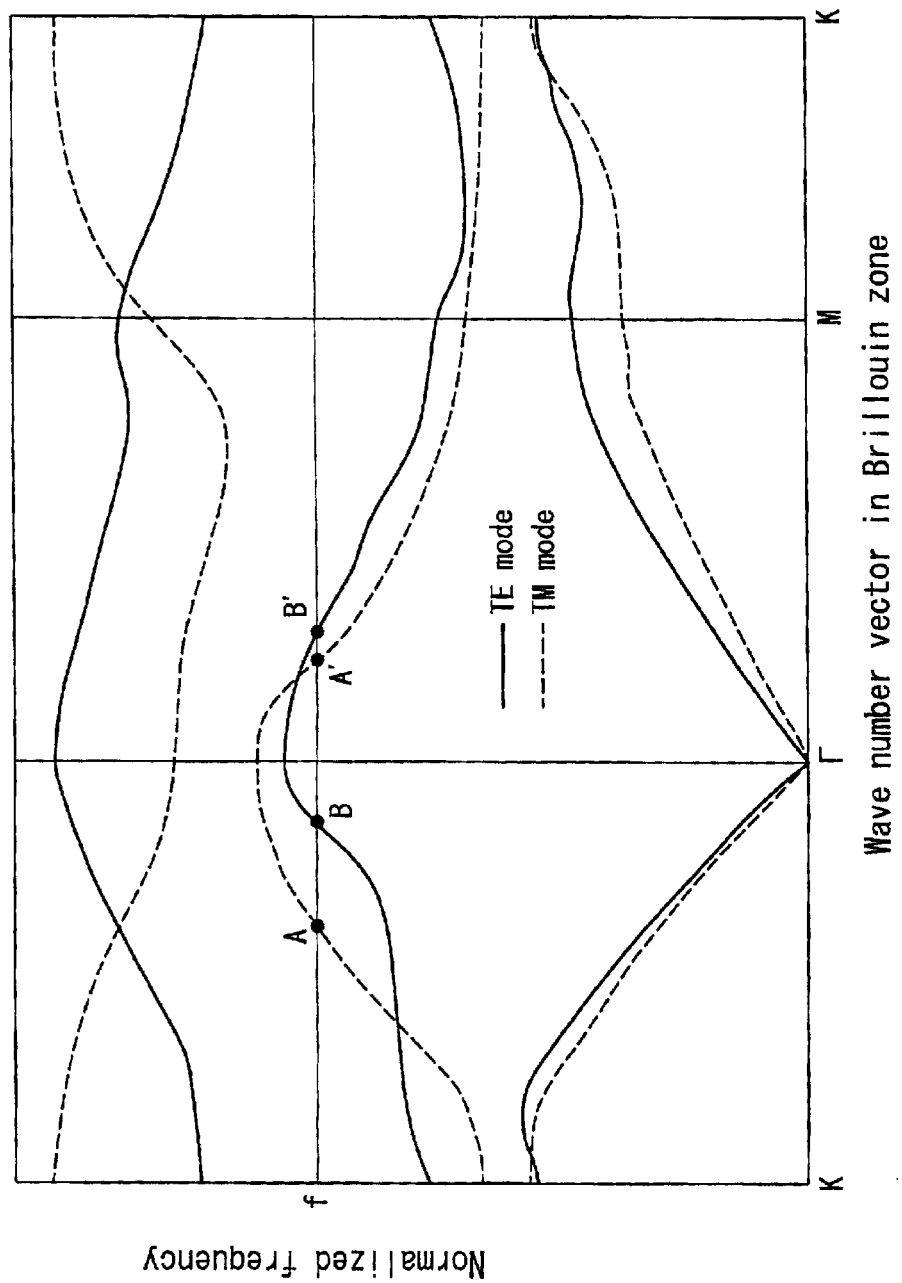
FIG. 2 illustrates an example of the photonic bands for the demultiplexing portion used in the optical device of the present invention.

FIG. 2 shows, as an example of the photonic band of the demultiplexing portion 4, a photonic band having reciprocal lattice vectors in the K direction and in the M direction. The wave number vectors in the Brillouin zone on the horizontal axis in FIG. 2 correspond to the propagation directions of the light in the demultiplexing portion 4. The normalized frequency on the vertical axis corresponds to the wavelength of the light source. In the example in FIG. 2, for the frequency f (wavelength λ), the TM mode has the wave number of point A (in the K direction) or point A' (in the M direction), and the TE mode has the wave number of point B (in the K direction) or point B' (in the M direction). As shown in FIG. 2, the wave number of the TE wave in the M direction is larger than the wave number of the TM wave. In the K direction, the wave number of the TE wave is smaller than the wave number of the TM wave. Consequently, the dispersion surfaces of the TE wave and the TM wave at the frequency f are hexagonally symmetrical as shown in FIG.

Figure 3:
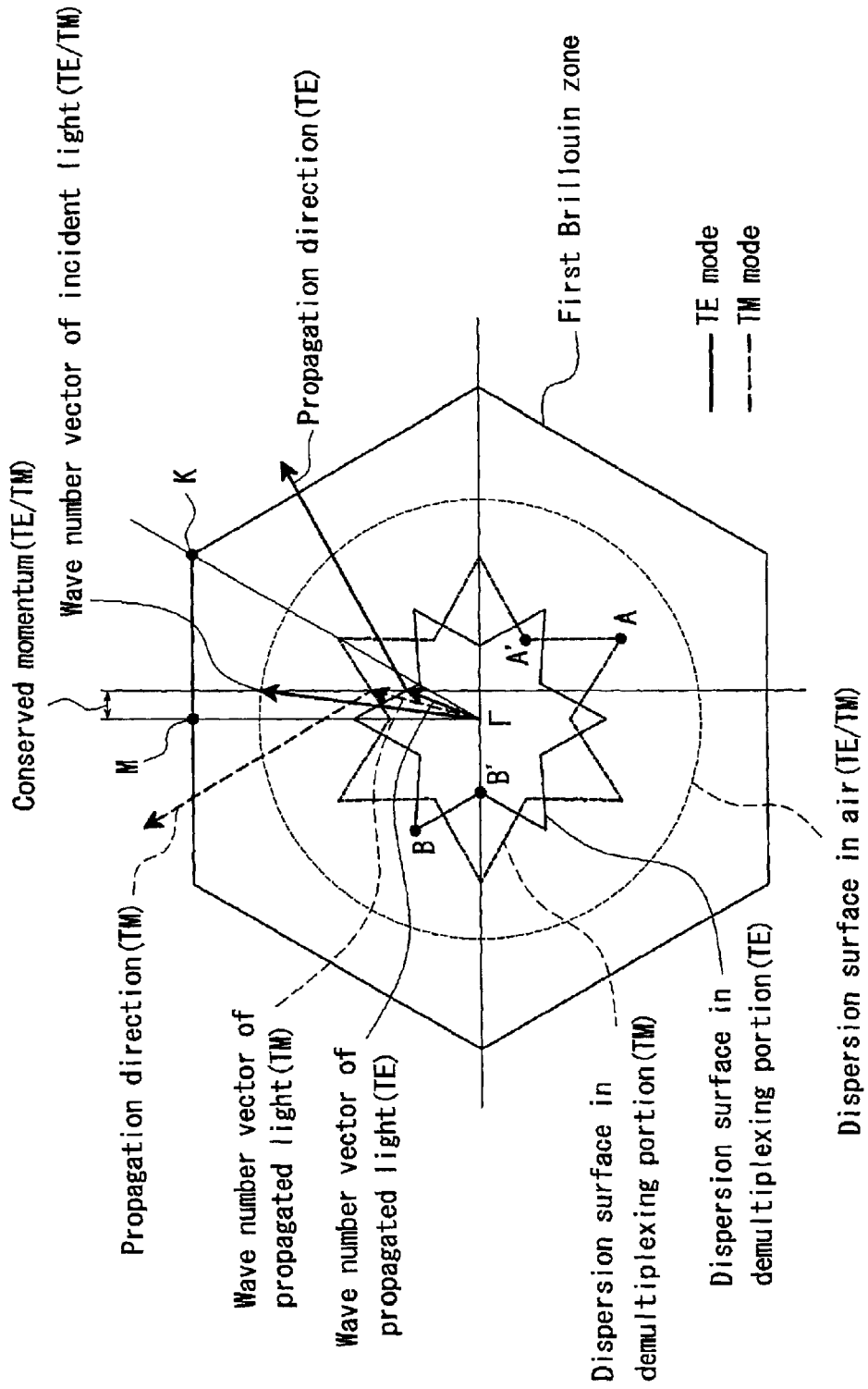
FIG. 3 illustrates an example of the dispersion surfaces and propagation directions of light in the demultiplexing portion used in the optical device of the present invention.

3, and the size of the wave number of the TE wave and the wave number of the TM wave alternate in the M direction and in the K direction. As a result, in every direction, the direction perpendicular to the dispersion surface (group velocity direction) is very different for the TE wave and the TM wave, and a large separation angle can be attained. FIG. 3 shows an example of the separation into TE wave and TM wave.

As shown in FIG. 3, with the demultiplexing portion 4, the wave number vector of the TE wave and the wave number vector of the TM wave in the demultiplexing portion 4 are determined by the law of conservation of momentum of the electric field components at the boundary faces giving the boundary conditions. The perpendicular line (in the gradient direction) on the dispersion surface at the end point of the wave number vectors of the TE wave and the TM wave incident on the demultiplexing portion 4 is the propagation direction (group velocity direction). The propagation direction of the TE wave and the TM wave is determined by their dispersion surfaces, so that in the example in FIG. 3, the separation angle is about 90°. In natural birefringent materials, such as rutile, the attained separation angle is barely 15°, so that the advantageous effect of the present invention is apparent. Moreover, the separation angle of TE wave and TM wave in the demultiplexing portion 4 becomes larger, with the increases in the difference between the wave numbers of the TE wave and the TM wave in M direction and the difference between the wave numbers of the TE wave and the TM wave in K direction. These wave number differences can be freely varied, because they are determined by the refractive index difference and shape of the first and second materials constituting the demultiplexing portion 4.

Thus, by making the difference between the TE wave dispersion surface and the TM wave dispersion surface large and achieving an enormous separation angle, the demultiplexing portion can be made very short, so that it becomes possible to separate TE waves and TM waves at a propagation distance with little influence of diffraction. As a result, the device can be made smaller, and it becomes possible to reduce components such as lenses. For example, let us consider an optical device 10, in which the optical fiber 1 on the ingoing side is arranged in contact with the ingoing surface of the demultiplexing portion 4, and the optical fibers 2 and 3 on the outgoing side are arranged in contact with the outgoing surface of the demultiplexing portion 4. In this case, if the TE wave and the TM wave are to be coupled into two adjacent single-mode fibers of 150 $\mu$m diameter, and the separation angle is 170°, then the length of the demultiplexing portion 4 can be shortened to about 6.5 $\mu$m.

Also, as can be seen from FIG. 3, the separation directions of the TE wave and the TM wave also depend on the direction of the incident light. Therefore, by adjusting the length of the demultiplexing portion 4 in the optical propagation direction and the direction of the light incident from the optical fiber 1 on the demultiplexing portion 4, it is also possible to couple the TE wave and the TM wave into an optical fiber 2 and an optical fiber 3 arranged at any desired position.

The optical fiber 1 functions as an optical input portion for inputting incident light of at least the wavelength $\lambda$ into the demultiplexing portion 4. The optical fiber 1 inputs light in a direction that is parallel to a plane (also referred to as "plane $P_{12}$" in the following) including the direction (K) 11 of the first reciprocal lattice vector $\alpha_1$ and the direction (M) 12 of the second reciprocal lattice vector $\alpha_2$. The optical fibers 2 and 3 function as optical output portion receiving light that is outputted by the demultiplexing portion 4 and outputting this light to the outside. The TM wave 6 and the TE wave 7 that are separated by the demultiplexing portion 4 are incident on the end portion of the optical fiber 2 and the end portion of the optical fiber 3, respectively. The outgoing optical fibers are arranged parallel to the plane $P_{12}$ (this also applies to the following embodiments). In general, the optical fiber on the ingoing side and the optical fibers on the outgoing side are arranged parallel to one another (this also applies to the following embodiments).

The following is an explanation of the demultiplexing portion 4. For the first material 8 of the demultiplexing portion 4, it is possible to use for example Si, $SiO_2$, GaAs, or a polymer. The columnar portions 9 of the demultiplexing portion 4 are made of a second material with a different refractive index than the first material 8, and can be made of Si, $SiO_2$, GaAs or a polymer, for example. It is also possible that either the first material 8 or the second material are made of air. The demultiplexing portion 4 is made by forming parallel columnar holes periodically in the first material 8 serving as the base, and filling these columnar holes with a material having a different refractive index than the first material 8. It is also possible to irradiate the first material 8 with a laser beam to alter the refractive index of portions of the first material 8. It is further possible to stack columnar objects upon one another.

Figure 4A:
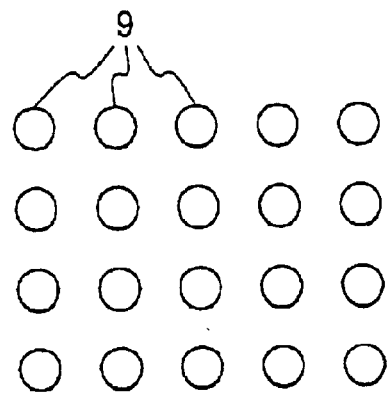
FIGS. 4A, 4B and 4C schematically illustrate first, second and third configurations of the demultiplexing portion used in the optical device of the present invention.
Figure 4B:
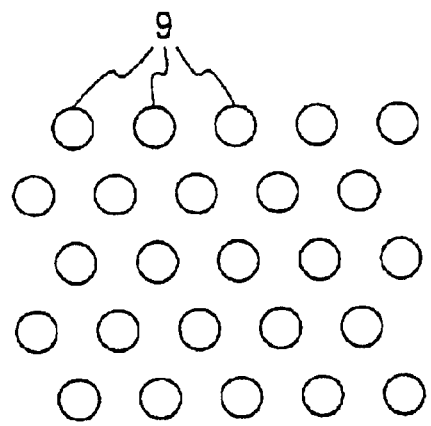
Figure 4C:
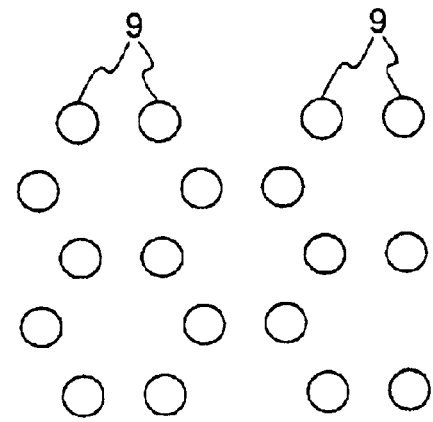

The demultiplexing portion 4 can be of any structure, as long as it satisfies the following three conditions (i) to (iii) (the same applies to the following embodiments): (i) The angle defined by the first reciprocal lattice vector $\alpha_1$ and the second reciprocal lattice vector $\alpha_2$ at the used wavelength is not greater than 90° (preferably at least 45° and at most 90°) (ii) The wave number of the TE waves in the direction of the first reciprocal lattice vector $\alpha_1$ (direction K) is larger than the wave number of the TM waves. (iii) The wave number of the TE waves in the direction of the second reciprocal lattice vector $\alpha_2$ (direction M) is smaller than the wave number of the TM waves. Consequently, the demultiplexing portion 4 is not limited to the structure shown in FIG. 1. For example, it is also possible to arrange the columnar portions 9 as shown in FIGS. 4A, 4B or 4C. In FIG. 4A, the columnar portions 9 are arranged at the adjacent lattice points of a square lattice. In FIG. 4B, the columnar portions 9 are arranged at the adjacent lattice points of a regular triangular lattice. And in FIG. 4C, the columnar portions 9 are arranged at the adjacent lattice points of a hexagonal lattice. In these arrangements, the directions of the respective reciprocal lattice vectors are different.

In the demultiplexing portion 4, the refractive index changes periodically in a two-dimensional direction at a certain cross section. Alternatively, it is also possible to adopt a structure in which the refractive index changes periodically in a three-dimensional direction. More specifically, it is possible to use a demultiplexing portion including a first material, and particles (made of a second material having a refractive index different from the first material) that are arranged at a certain constant period inside this first material. For example, when forming a face-centered cubic, body-centered cubic structure or a closely packed filled structure of a spherical material (for example, $SiO_2$ particles or polymer particles) that is piled up three-dimensionally, then there are at least two reciprocal lattice vectors in this structure. Of these, the appropriate two reciprocal lattice vectors should be selected, so that at the used wavelength, the wave number of the TE waves is larger than the wave number of the TM waves in the first reciprocal lattice vector direction, and the wave number of the TE waves is smaller than the wave number of the TM waves in the second reciprocal lattice vector direction. By changing the structure and the difference of the refractive indices of the material constituting the demultiplexing portion, it is possible to separate TE waves and TM waves with the same mechanism as with the demultiplexing portion 4. The demultiplexing portion 4 also can be made of a first layer and a second layer that are layered in alternation in the incidence direction of incident light. In that case, the first layer is made of the first material, and the second layer is made of the second material, which is different from the first material. Such a demultiplexing portion can be made by sputtering, for example.

Embodiment 2

Embodiment 2 illustrates a demultiplexer as an example of an optical device according to the present invention. FIG. 5A schematically illustrates the configuration of an optical device 50 of Embodiment 2. FIG. 5B illustrates the polarization state of the light emitted from the various optical components.

The optical device 50 includes an ingoing optical fiber 1, outgoing optical fibers 51 to 54, a first demultiplexing portion 4 (first optical member), a second demultiplexing portion 56 (second optical member), and a guide 57. The guide 57 fixes the relative positions of the optical fiber 1, the first demultiplexing portion 4, the second demultiplexing portion 56, and the optical fibers 51 to 54. The first demultiplexing portion 4, the second demultiplexing portion 56, and the optical fibers 51 to 54 are arranged such that light that is inputted by the optical fiber 1 is transmitted in that order.

The first demultiplexing portion 4 and the second demultiplexing portion 56 are optical members having a structure similar to the demultiplexing portion 4 in Embodiment 1. That is to say, these optical members include a first material 8 having an ingoing plane and an outgoing plane that are parallel to one another, and a plurality of columnar portions 9 arranged inside the first material 8. The columnar portions 9 are made of a second material whose refractive index is different from that of the first material 8. The center axes of the columnar portions 9 are parallel to one another, and parallel to the ingoing plane of the first material 8. The columnar portions 9 are distributed periodically with a certain constant period in two-dimensional direction.

The second demultiplexing portion 56 is displaced by an angle of 45° around the optical axis with respect to the first demultiplexing portion 4. That is to say, the plane including the first reciprocal lattice vector $\alpha_1$ and the second reciprocal lattice vector $\alpha_2$ of the first demultiplexing portion 4 and the optical axis and the plane including the first reciprocal lattice vector $\beta_1$ and the second reciprocal lattice vector $\beta_2$ of the second demultiplexing portion 56 and the optical axis define an angle of 45° around the optical axis. It should be noted that throughout this specification, "optical axis" means the optical axis of the incident light.

The light that is incident from the optical fiber 1 enters the first demultiplexing portion 4 in a direction that is parallel to the plane including the first reciprocal lattice vector $\alpha_1$ and the second reciprocal lattice vector $\alpha_2$. Light that has been transmitted by the first demultiplexing portion 4 and the second demultiplexing portion 56 is separated into a TM wave (1), a TM wave (2), a TE wave (1) and a TE wave (2). The TM wave (1), the TM wave (2), the TE wave (1) and the TE wave (2) are coupled into the end portions of the optical fibers 51 to 54 (F(1) to F(4)) on the outgoing side.

In the photonic bands of the first demultiplexing portion 4 and the second demultiplexing portion 56, as in the photonic band explained in Embodiment 1, the wave number of the TE waves is larger than the wave number of the TM waves in the first reciprocal lattice vector direction, and the wave number of the TE waves is smaller than the wave number of the TM waves in the second reciprocal lattice vector direction. Therefore, in both demultiplexing portions, the dispersion surface of the TM waves is very different from the dispersion surface of the TE waves, so that the separation angles between TM waves and TE waves can be set very large.

In the optical device 50, the first demultiplexing portion 4 and the second demultiplexing portion 56 are arranged at an angle of 45° with respect to the optical axis. Therefore, the plane including the propagation directions of the TM wave and the TE wave that are separated by the first demultiplexing portion 4 is displaced by 45° with respect to the plane including the propagation directions of the TM waves and the TE waves that are separated by the second demultiplexing portion 56. That is to say, as shown in FIG. 5B, the unpolarized light incident from the optical fiber 1 (TM wave 6 and TE wave 7) are separated by the first demultiplexing portion 4 into a TM wave and a TE wave in the plane $P_{12}$ that includes the first reciprocal lattice vector $\alpha_1$ and the second reciprocal lattice vector $\alpha_2$ of the first demultiplexing portion 4. Then, these TM and TE waves are separated by the second demultiplexing portion 56 into a TM wave (1) and a TM wave (2), and into a TE wave (1) and a TE wave (2), respectively. In this situation, the polarization plane of the TM wave 6 is displaced by 45° with respect to the polarization planes of the TM wave (1) and the TM wave (2). Also the polarization plane of the TE wave 7 is displaced by 45° with respect to the polarization planes of the TE wave (1) and the TE wave (2). Consequently, the optical fibers 51 to 54, which are arranged in correspondence with the outgoing positions of the TM wave (1), the TM wave (2), the TE wave (1) and the TE wave (2) are placed in a staggered arrangement in the vertical direction with respect to the plane $P_{12}$ including the first reciprocal lattice vector $\alpha_1$ and the second reciprocal lattice vector $\alpha_2$ of the first demultiplexing portion 4.

Embodiment 3

Figures 6A, 6B:
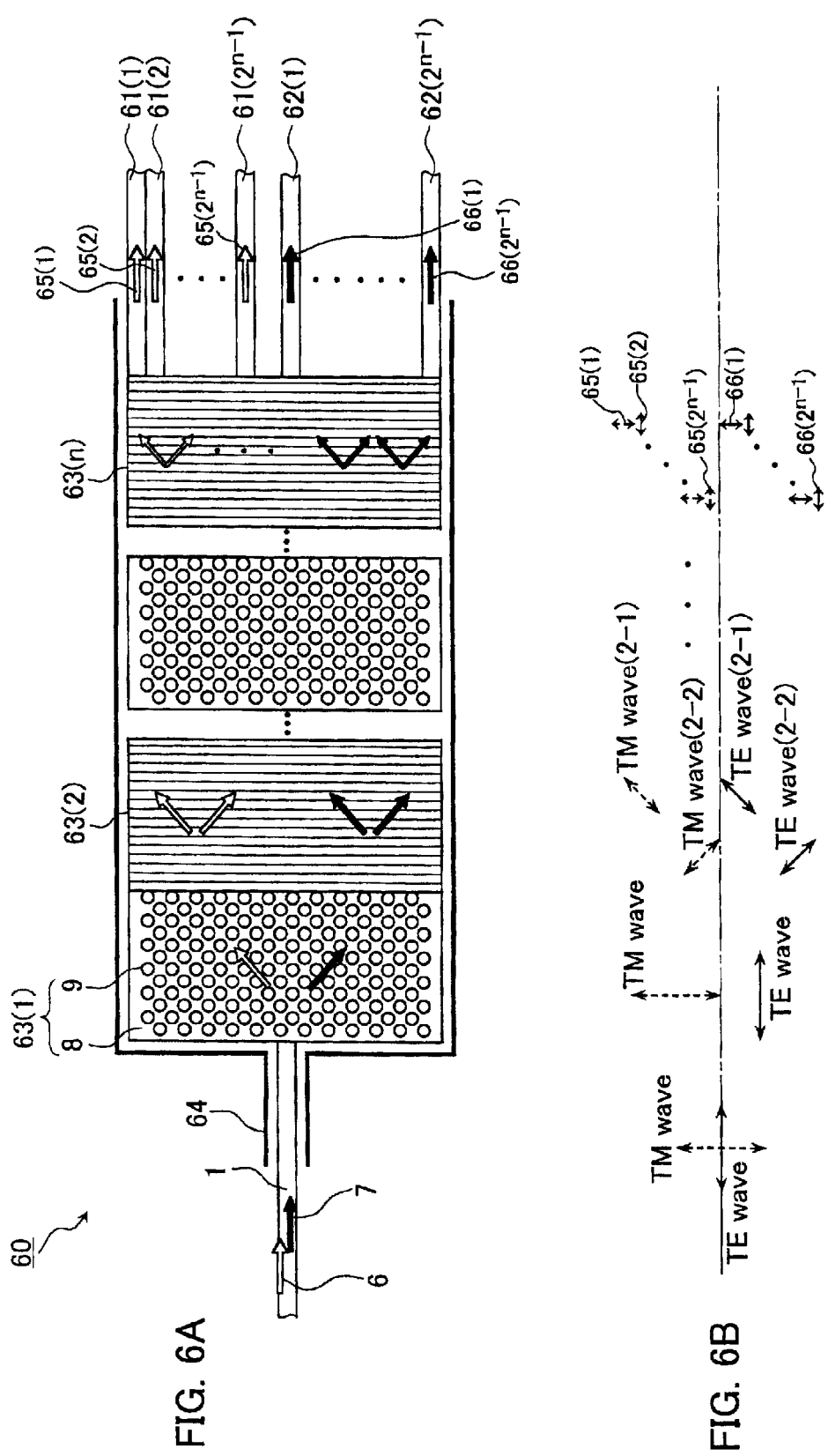
FIG. 6A schematically illustrates yet another configuration of the optical device of the present invention, and FIG. 6B schematically illustrates the polarization state of light therein.

Embodiment 3 illustrates a demultiplexer as an example of an optical device according to the present invention. FIG. 6A schematically illustrates the configuration of an optical device 60 of Embodiment 3. FIG. 6B illustrates the polarization state of the light emitted from the various optical components.

The optical device 60 is a 2n demultiplexer. The optical device 60 includes an ingoing optical fiber 1, outgoing optical fibers 61(1) to 61($2^{n-1}$) and 62(1) to 62($2^{n-1}$), n demultiplexing portions 63(1) to 63(n), and a guide 64. The guide 64 fixes the relative positions of the optical fiber 1, the optical fibers 61 and 62, and the demultiplexing portions 63.

The n demultiplexing portions 63(1) to 63(n) are optical members having a structure similar to the demultiplexing portion 4 in Embodiment 1. That is to say, these optical members include a first material 8 having an ingoing plane and an outgoing plane that are parallel to one another, and columnar portions 9 arranged inside the first material 8. The columnar portions 9 are made of a second material whose refractive index is different from that of the first material 8. The center axes of the columnar portions 9 of the demultiplexing portions are parallel to one another, and parallel to the ingoing plane of the first material 8. The columnar portions 9 are distributed periodically with a certain constant period in two-dimensional direction.

The k-th demultiplexing portion 63(k) (wherein k is an integer between 2 and n) is arranged such that it receives light that is input from the optical fiber 1 and output by the demultiplexing portion 63(k−1). The demultiplexing portion 63(k) is displaced by 45° around the optical axis with respect to the demultiplexing portion 63(k−1). More specifically, the center axes of the columnar portions of the demultiplexing portion 63(k) are displaced by 45° with respect to the center axes of the columnar portions of the demultiplexing portion 63(k−1). In other words, when the plane $k_{12}$ is the plane including the first reciprocal lattice vector $k_1$ and the second reciprocal lattice vector $k_2$ of the demultiplexing portion 63(k) and the optical axis, and the plane $(k-1)_{12}$ is the plane including the first reciprocal lattice vector $(k-1)_1$ and the second reciprocal lattice vector $(k-1)_2$ of the demultiplexing portion 63(k−1) and the optical axis, then the plane $k_{12}$ and the plane $(k-1)_{12}$ define an angle of 45° around the optical axis.

The optical fiber 1 inputs the incident light in a direction that is parallel to the plane including the first reciprocal lattice vector and the second reciprocal lattice vector of the demultiplexing portion 63(1). Light that has passed the demultiplexing portions 63(1) to 63(n) is separated into TM waves 65(1) to $65(2^{n-1})$ and TE waves 66(1) to $66(2^{n-1})$. These $2^n$ light beams are each coupled into a different fiber, namely the optical fibers 61(1) to $61(2^{n-1})$, and the optical fibers 62(1) to $62(2^{n-1})$.

The photonic bands of the demultiplexing portions 63(1) to 63(n) are similar to the photonic bands of the demultiplexing portion 4 in Embodiment 1. This means, the wave number of the TE waves is larger than the wave number of the TM waves in the first reciprocal lattice vector direction, and the wave number of the TE waves is smaller than the wave number of the TM waves in the second reciprocal lattice vector direction. Thus, in each demultiplexing portion, the dispersion surface of the TM waves is very different from the dispersion surface of the TE waves, so that the separation angles between TM waves and TE waves can be set very large.

The demultiplexing portion 63(k−1) and the demultiplexing portion 63(k) are arranged at an angular displacement of 45° with respect to the optical axis. Therefore, the plane including the propagation directions of the TM waves and the TE waves that are separated by the demultiplexing portion 63(k−1) is displaced by 45° with respect to the plane including the propagation directions of the TM waves and the TE waves that are separated by the demultiplexing portion 63(k). Thus, the unpolarized light incident from the optical fiber 1 is separated by the demultiplexing portion 63(k−1) into a first to $2^{k-2}$-th TM wave (k−1) and a first to $2^{k-2}$-th TE wave (k−1) in the plane that includes the first reciprocal lattice vector and the second reciprocal lattice vector of the demultiplexing portion 63(k−1). Then, these light beams are further separated by the demultiplexing portion 63(k) into a first to $2^{k-1}$-th TM wave (k) and a first to $2^{k-1}$-th TE wave (k). In this situation, the polarization planes of the first to $2^{k-2}$-th TM wave (k−1) are displaced by 45° against the polarization planes of the first to $2^{k-2}$-th TM wave (k). Also the polarization planes of the first to $2^{k-2}$-th TE wave (k−1) are displaced by 45° against the polarization planes of the first to $2^{k-1}$th TE wave (k).

The optical fibers 61(1) to $61(2^{n-1})$ are arranged in correspondence with the $2^{n-1}$ TM waves that are emitted from the demultiplexing portion 63(n). Furthermore, the optical fibers 62(1) to $62(2^{n-1})$ are arranged in correspondence with the $2^{n-1}$ TE waves that are output from the demultiplexing portion 63(n). As a result, the optical fibers 61(1) to $61(2^{n-1})$ and the optical fibers 62(1) to $62(2^{n-1})$ are placed in a staggered arrangement in the vertical direction with respect to the plane including the first reciprocal lattice vector and the second reciprocal lattice vector of the demultiplexing portion 63(1).

Embodiment 2 and Embodiment 3 have been explained for optical devices, in which a plurality of demultiplexing portions are linked. However, the structure of the demultiplexing portions is not limited to this. For example, a structure in which a plurality of demultiplexing portions is formed in one piece is also possible (the same applies to the following embodiments as well). In this case, first, a first demultiplexing portion is formed by layering in alternation (e.g. by sputtering) two materials with different refractive indices. Then, the first demultiplexing portion is rotated for 45° around the propagation direction of the light, and a second demultiplexing portion is formed by layering in alternation two materials with different refractive indices. By repeating these steps for a number of times, an optical member in which a plurality of demultiplexing portions are integrated into one piece can be formed.

Furthermore, in the optical devices of Embodiment 1 to Embodiment 3, it is also possible to position the optical fibers using a substrate provided with grooves (for example grooves with a V-shaped or U-shaped cross section) for positioning at least one optical fiber (the same applies to the following embodiments as well). By integrating such a substrate with the demultiplexing portion adjacent to the optical fibers, the optical fibers and the demultiplexing portions can be coupled without having to adjust the optical axes. Furthermore, by forming a structure in which two materials with different refractive indices are distributed periodically with a certain constant period on such a substrate with grooves, it is possible to integrate the demultiplexing portion and the substrate with grooves into one component.

Embodiment 4

Figure 7A:
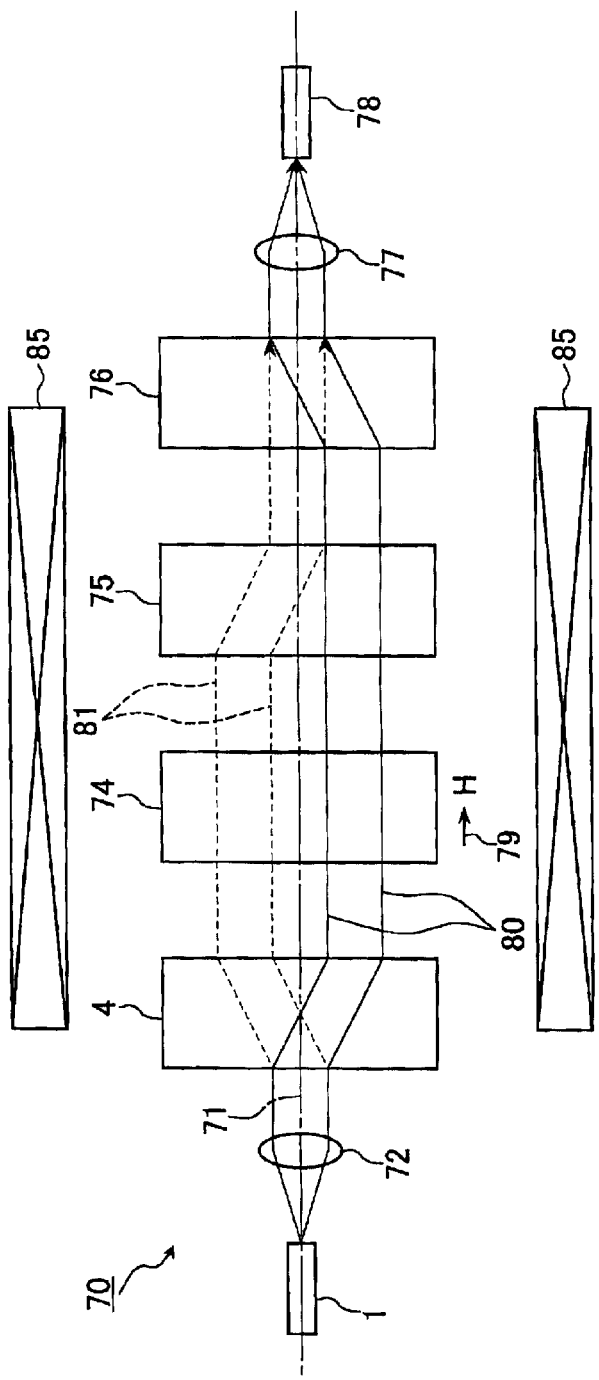
FIG. 7A schematically illustrates yet another configuration of the optical device of the present invention, and FIG. 7B schematically illustrates the polarization state of forward light therein.
Figure 7B:
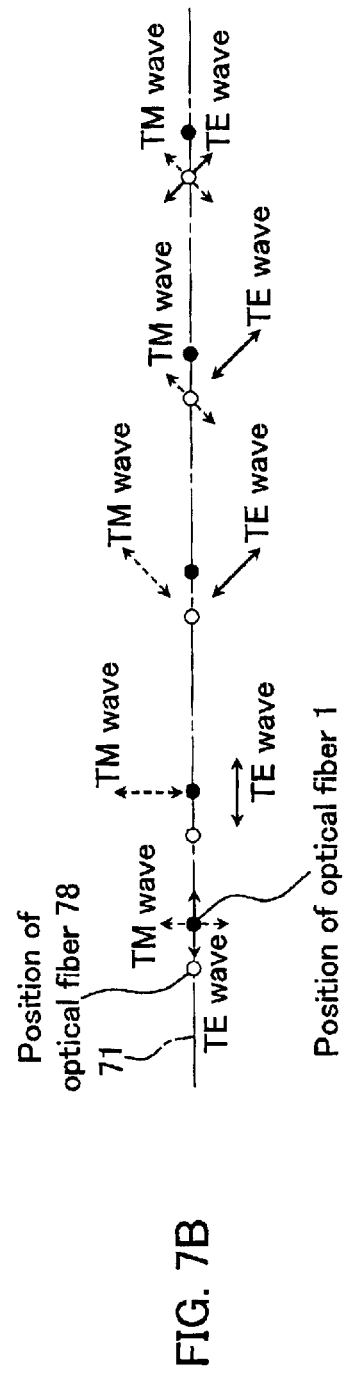
Figure 8A:
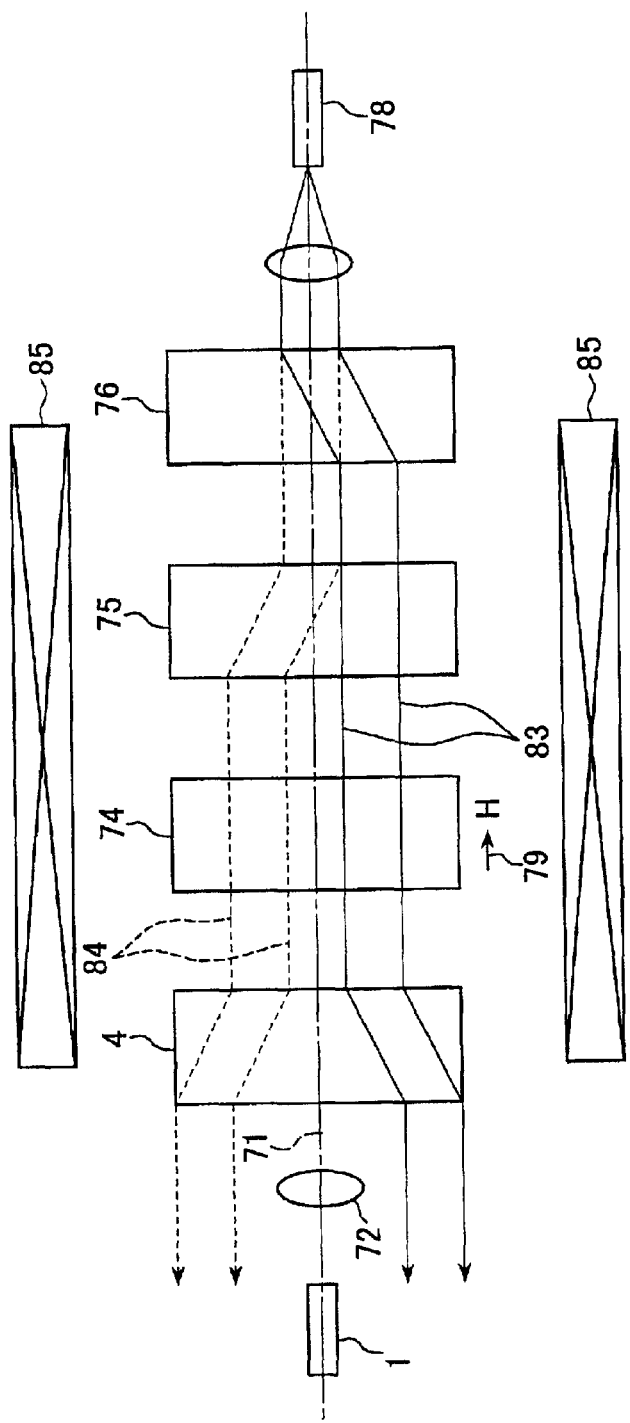
FIG. 8A schematically illustrates the light path of return light, and FIG. 8B schematically illustrates the polarization state of return light in the optical device shown in FIG. 7A.
Figure 8B:
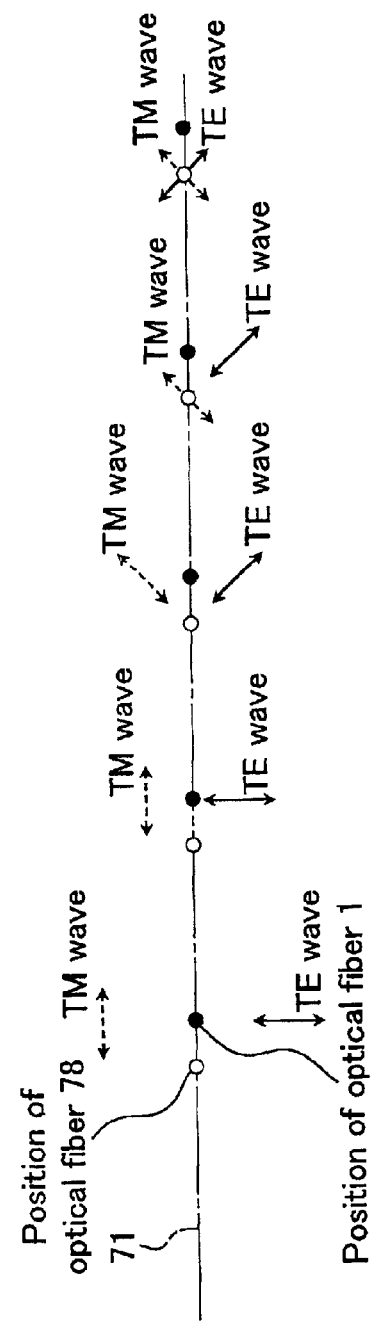

Embodiment 4 illustrates a polarization insensitive isolator as an example of an optical device according to the present invention. FIG. 7A illustrates the configuration of an optical device 70 according to Embodiment 4 and the light path of forward light. FIG. 7B illustrates the polarization state of the forward light as it is emitted from the various optical components. FIG. 8A shows the light path of the return light, and FIG. 8B shows the polarization state of the return light as it is emitted from the various optical components.

The optical device 70 includes an ingoing optical fiber 1, an ingoing lens 72, a first demultiplexing portion 4, a Faraday crystal 74, a second demultiplexing portion 75, a third demultiplexing portion 76, an outgoing lens 77 and an outgoing optical fiber 78. These optical components are arranged in a line along the optical axis 71, such that the light inputted from the optical fiber 1 is transmitted through the lens 72, the first demultiplexing portion 4, the Faraday crystal 74, the second demultiplexing portion 75, the third demultiplexing portion 76, the outgoing lens 77 and the outgoing optical fiber 78 in that order. The optical device 70 further includes a magnetic field generator 85 for applying a magnetic field 79 that saturates the rotation angle of the Faraday crystal 74.

For the Faraday crystal 74, it is possible to use a garnet or lead glass, for example. For the magnetic field generator 85, it is possible to use a magnet or electromagnet having a cylindrical shape. The magnetic field generators are not shown in drawings of the following embodiments, but the magnetic field generator similar to the magnetic generator 85 can be used.

The first demultiplexing portion 4, the second demultiplexing portion 75 and the third demultiplexing portion 76 are optical members having a structure similar to the demultiplexing portion 4 of Embodiment 4. The first demultiplexing portion 4 and the second demultiplexing portion 75 are displaced by 45° around the optical axis 71. That is to say, the first reciprocal lattice vector of the first demultiplexing portion 4 and the first reciprocal lattice vector of the second demultiplexing portion 75 define an angle of 45°. The second demultiplexing portion 75 and the third demultiplexing portion 76 are displaced by 90° around the optical axis 71. That is to say, the first reciprocal lattice vector of the second demultiplexing portion 75 and the first reciprocal lattice vector of the third demultiplexing portion 76 define an angle of 90°.

The following is an explanation of the function of the optical device 70, referring to the drawings. As shown in FIG. 7A and 7B, unpolarized light that is incident from the optical fiber 1 is separated by the first demultiplexing portion 4 into a TE wave 80 and a TM wave 81. The TE wave 80 and the TM wave 81 emitted from the first demultiplexing portion 4 are rotated for 45° by the Faraday crystal 74. Then, in the second demultiplexing portion 75, only the TM wave 81 is shifted onto the optical axis 71, whereas in the third demultiplexing portion 76, only the TE wave 80 is shifted onto the optical axis 71. As a result, both the TE wave 80 and the TM wave 81 are coupled into the optical fiber 78.

FIGS. 8A and 8B illustrate the situation for return light. Of the unpolarized light emitted from the optical fiber 78, only the TE wave 83 is shifted away from the optical axis 71 in the third demultiplexing portion 76, and only the TM wave 84 is shifted away from the optical axis 71 in the second demultiplexing portion 75. Then, the TE wave 83 and the TM wave 84 are rotated for 45° by the Faraday crystal 74. Then, in the first demultiplexing portion 4, both the TE wave 83 and the TM wave 84 are shifted away from the optical axis 71. As the result, the TE wave 83 and the TM wave 84 of the return light are not coupled into the optical fiber 1 on the ingoing side. Consequently, with the optical device 70, light is transmitted only in one direction.

Embodiment 5

Figure 10A:
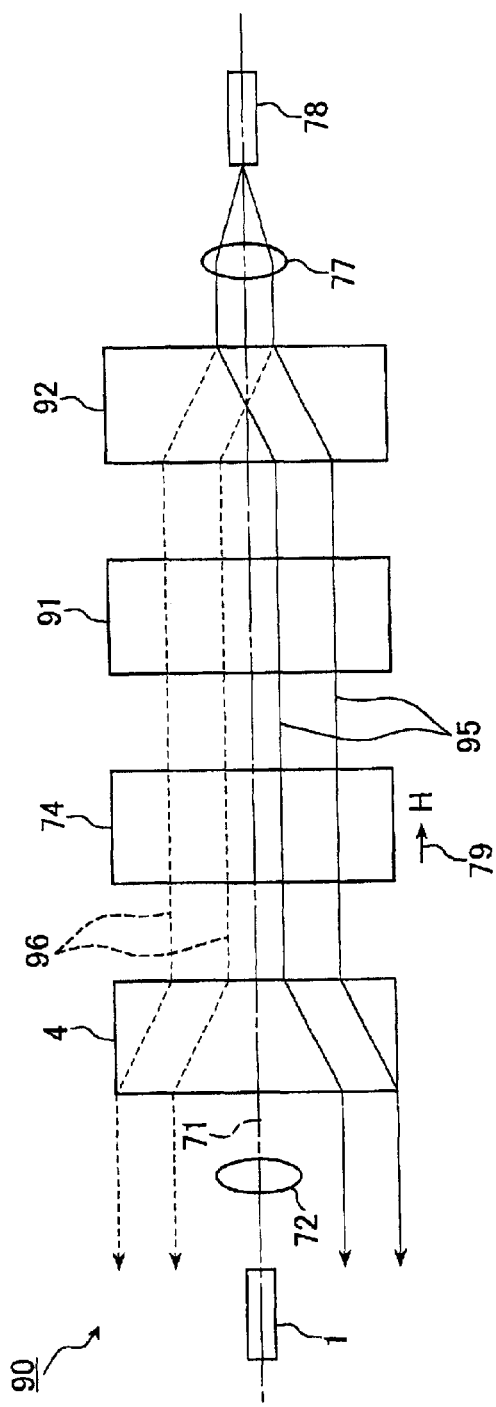
FIG. 10A schematically illustrates the light path of return light, and FIG. 10B schematically illustrates the polarization state of return light in the optical device shown in FIG. 9A.
Figure 10B:
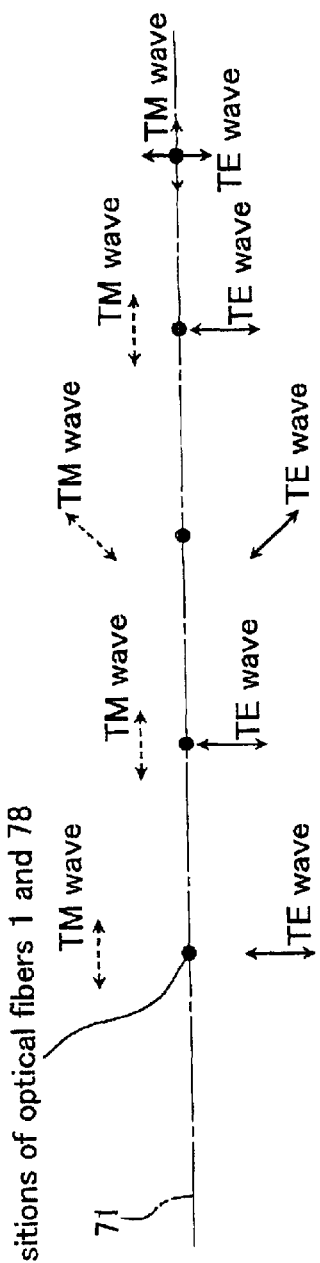

Embodiment 5 illustrates a polarization insensitive isolator as an example of an optical device according to the present invention. FIG. 9A illustrates the configuration of an optical device 90 according to Embodiment 5 and the light path of forward light. FIG. 9B illustrates the polarization state of the forward light as it is emitted from the various optical components. FIG. 10A illustrates the light path of the return light, and FIG. 10B illustrates the polarization state of the return light as it is emitted from the various optical components.

The optical device 90 includes an ingoing optical fiber 1, an ingoing lens 72, a first demultiplexing portion 4, a Faraday crystal 74, a polarization-rotating crystal 91, a second demultiplexing portion 92, an outgoing lens 77, and an outgoing optical fiber 78. These optical components are arranged in a line along the optical axis 71, such that the light inputted from the optical fiber 1 is transmitted through the lens 72, the first demultiplexing portion 4, the Faraday crystal 74, the polarization-rotating crystal 91, the second demultiplexing portion 92, the outgoing lens 77 and the outgoing optical fiber 78 in that order. The optical device 90 further includes a magnetic field generator (not shown in the drawings) for applying a magnetic field 79 that saturates the rotation angle of the Faraday crystal 74.

The first demultiplexing portion 4 and the second demultiplexing portion 92 are optical members having a structure similar to the demultiplexing portion 4 in Embodiment 1. The polarization-rotating crystal 91 can be quartz, for example.

The first demultiplexing portion 4 and the second demultiplexing portion 92 are arranged in the same optical direction with respect to the optical axis 71. More specifically, the first reciprocal lattice vector of the first demultiplexing portion 4 is parallel to the first reciprocal lattice vector of the second demultiplexing portion 92.

The following is an explanation of the function of the optical device 90, referring to the drawings. As shown in FIG. 9A and 9B, unpolarized light that is incident from the optical fiber 1 is separated by the first demultiplexing portion 4 into a TE wave 93 and a TM wave 94. The TE wave 93 and the TM wave 94 are rotated for 45° by the Faraday crystal 74. Then, the TE wave 93 and the TM wave 94 are rotated for a further 45° by the polarization-rotating crystal 91. Then, in the second demultiplexing portion 92, both the TE wave 93 and the TM wave 94 are shifted onto the optical axis 71. Thus, both the TE wave 93 and the TM wave 94 are coupled into the outgoing optical fiber 78.

As shown in FIGS. 10A and 10B, the unpolarized light emitted from the optical fiber 78 is separated by the second demultiplexing portion 92 into a TE wave 95 and a TM wave 96. The second demultiplexing portion 92 shifts the TE wave 95 and the TM wave 96 into different directions with respect to the optical axis 71. Then, the TE wave 95 and the TM wave 96 are rotated for −45° by the polarization-rotating crystal 91. Then, the TE wave 95 and the TM wave 96 are rotated for 45° by the Faraday crystal 74, such that their polarization state is the same as when they are emitted from the second demultiplexing portion 92. Then, in the first demultiplexing portion 4, the TE wave 95 and the TM wave 96 are shifted further away from the optical axis 71. As a result, neither the TE wave 95 nor the TM wave 96 is coupled into the optical fiber 1. Consequently, with the optical device 90, light is transmitted only in one direction.

Embodiment 6

Embodiment 6 illustrates a demultiplexer as an example of an optical device according to the present invention. FIG. 11A schematically illustrates the configuration of an optical device 110 of Embodiment 6. FIG. 11B illustrates the polarization state of the light emitted from the various optical components.

The optical device 110 includes an ingoing optical fiber 1, a first demultiplexing portion 4, a phase retarder 112 (second optical member), outgoing fibers 113 and 114, and a guide 115. The guide 115 fixes the relative positions of the optical components. The first demultiplexing portion 4, the phase retarder 112, and the outgoing optical fibers are arranged such that light from the optical fiber 1 is transmitted in that order.

The first demultiplexing portion 4 and the optical retarder 112 are optical members having a structure similar to the demultiplexing portion 4 in Embodiment 1. That is to say, the first demultiplexing portion 4 includes a first material 8 having an ingoing plane and an outgoing plane that are parallel to one another, and columnar portions 9 arranged inside the first material 8. The columnar portions 9 are made of a second material whose refractive index is different from that of the first material 8. The center axes of the columnar portions 9 are parallel to one another, and parallel to the ingoing plane of the first material 8. The columnar portions 9 are distributed periodically with a certain constant period. The phase retarder 112 includes a third material 8a having an ingoing plane and an outgoing plane that are parallel to one another, and columnar portions 9a arranged inside the third material 8a. The columnar portions 9a are made of a fourth material whose refractive index is different from that of the third material 8a. The center axes of the columnar portions 9a; are parallel to one another, and parallel to the ingoing plane of the third material 8a. The columnar portions 9a are distributed periodically with a certain constant period. The direction of the center axes of the columnar portions 9 and the direction of the center axes of the columnar portions 9a define an angle of 45°.

The optical fiber 1 inputs incident light in a direction that is parallel to the plane including the direction (K) 11 of the first reciprocal lattice vector $\alpha_1$ and the direction (M) 12 of the second reciprocal lattice vector $\alpha_2$ of the first demultiplexing portion 4. The optical fiber 1 inputs p incident light beams (wherein p is an integer of two or greater), whose wavelengths range from a wavelength $\lambda(1)$ equal to $\lambda$ and increase at constant wavelength intervals to a wavelength $\lambda(p)$, into the first demultiplexing portion 4. This means, the incident light beams have the wavelengths $\lambda$, $\lambda+C$, $\lambda+2C$, ..., $\lambda+pC$ (wherein C is a constant). In the following, odd-numbered wavelengths are also expressed as $\lambda(2q-1)$, and even-numbered wavelengths are also expressed as $\lambda(2q)$.

The TE waves $(2q-1)$ and the TM waves $(2q-1)$ of the odd-numbered wavelengths $\lambda(2q-1)$ and the TE waves $(2q)$ and the TM waves $(2q)$ of the even-numbered wavelengths $\lambda(2q)$ are input into the first demultiplexing portion 4.

The optical fiber 113 receives the TM waves $(2q-1)$ and the TM waves $(2q)$ that are output from the phase retarder 112. The optical fiber 114 receives the TE waves $(2q-1)$ and the TE waves $(2q)$ that are output from the phase retarder 112. The optical fiber 113 and the optical fiber 114 function as an optical output portion.

The photonic band of the first demultiplexing portion 4 is for example as shown in FIG. 2. Also, the propagation direction of light incident on this optical member is as shown in FIG. 3.

Figure 12:
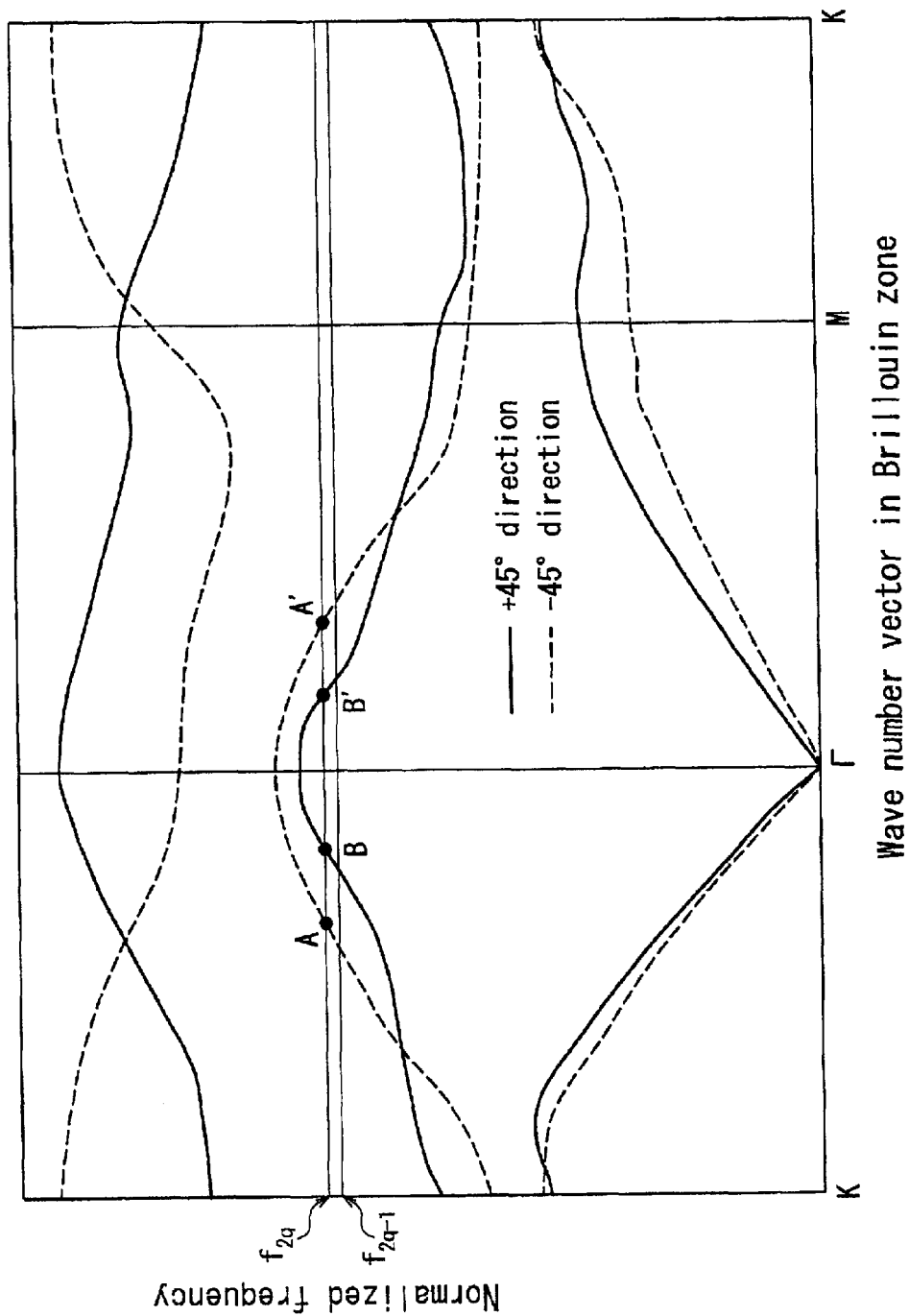
FIG. 12 illustrates an example of the photonic bands in a phase retarder used in the optical device of the present invention.

On the other hand, FIG. 12 shows an example of the photonic band of the phase retarder 112, which has reciprocal lattice vectors in the K direction and in the M direction. In the example of FIG. 12, light of the frequency $f_{2q}$ corresponding to the wavelength $\lambda(2q)$ has the same wave number in a direction rotated −45° around the optical axis from the direction of the center axes of the columnar portions 9a, as shown by point A (in K direction) and point A' (in M direction). Similarly, the wave number is the same in a direction rotated +45° around the optical axis from the direction of the center axes of the columnar portions 9a, as shown by point B (in K direction) and point B' (in M direction). Thus, in both directions, the wave number in the −45° direction is larger.

Figure 13:
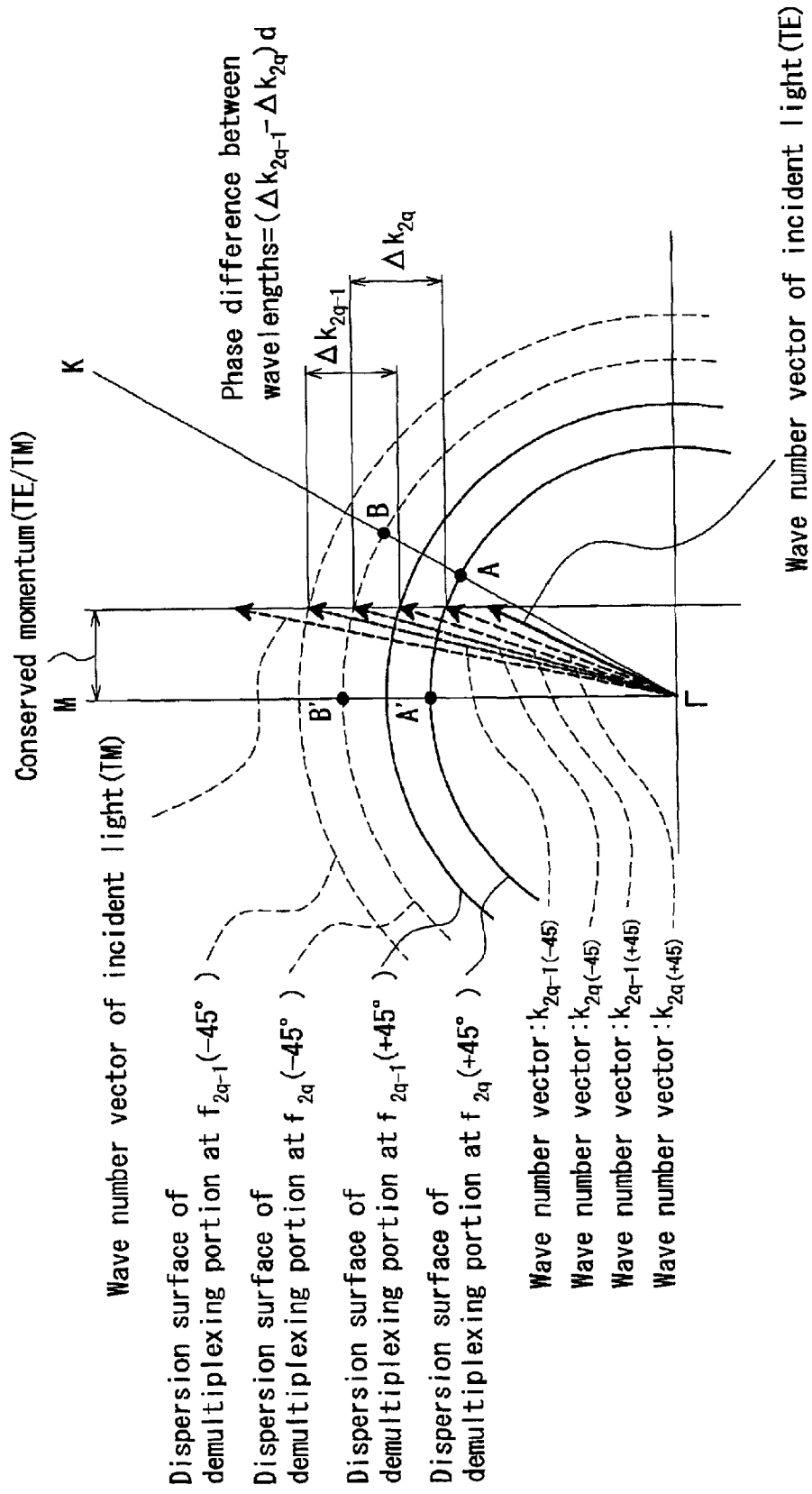
FIG. 13 illustrates an example of the dispersion surfaces and propagation directions of light in the phase retarder used in the optical device of the present invention.

The dispersion surface of the TE waves and the dispersion surface of the TM waves at the frequency $f_{2q}$ corresponding to the wavelength $\lambda(2q)$ are centrosymmetric, as shown in FIG. 13. FIG. 13 also shows the dispersion surface of the TE waves and of the TM waves at the frequency $f_{2q-1}$ corresponding to the wavelength $\lambda(2q-1)$. If there is incident light as shown in FIG. 13, the wave number vector in +45° direction and in −45° direction inside the phase retarder 112 are determined by the law of conservation of momentum of the electric field components at the boundary faces giving the boundary conditions. The phase difference (wave number difference $\Delta k \times$ propagation distance d) between +45° direction and −45° direction at the same wavelength determines the polarization at this wavelength. Linearly polarized light that is incident from the first demultiplexing portion 4 turns into light that is linearly polarized in the same direction if the phase difference is $2m\pi$ (m: integer), and into light that is linearly polarized at an angle of 90° if the phase difference is $(2m-1)\pi$. Consequently, if a plurality of wavelengths separated by constant wavelength intervals, like in WDM, are used, if the difference between the phase difference of the odd-numbered wavelengths and the phase difference of the even-numbered wavelengths is $m\pi$, then the linearly polarized light of the odd-numbered wavelengths is perpendicular to the linearly polarized light of the even-numbered wavelengths.

Let x be the difference of wave numbers between the first reciprocal vector direction and the second reciprocal vector direction of the phase retarder 112 at the odd-numbered wavelengths $\lambda(2q-1)$. And let y be the difference of wave numbers between the first reciprocal vector direction and the second reciprocal vector direction of the phase retarder 112 at the even-numbered wavelengths $\lambda(2q)$. Then, the difference between x and y is constant. Also, the plane including the first reciprocal lattice vector and the second reciprocal lattice vector of the first demultiplexing portion 4 and the plane including the first reciprocal lattice vector and the second reciprocal lattice vector of the phase retarder 112 define an angle of 45°.

By combining the first demultiplexing portion 4 and the phase retarder 112, the optical device 110 can separate light beams of a plurality of wavelengths $\lambda(1)$ to $\lambda(p)$ used for WDM into light with different polarization states and control the polarization states of each wavelength.

It should be noted that the phase retarder 112 can be manufactured with a method similar to the demultiplexing portion 4 explained in Embodiment 1.

Embodiment 7

Embodiment 7 illustrates an optical interleaver for WDM as an example of an optical device according to the present invention.

FIG. 14A shows an optical device 140 of Embodiment 7. FIG. 14B illustrates the polarization state of the light emitted from the various optical components.

The optical device 140 includes an ingoing optical fiber 1, an ingoing lens 141, a first demultiplexing portion 4, a phase retarder 142, a second demultiplexing portion 143, a multiplexing portion 144, an outgoing lens 145, and outgoing optical fibers 146 and 147. The ingoing lens 141, the first demultiplexing portion 4, the phase retarder 142, the second demultiplexing portion 143, the multiplexing portion 144, the lens 145, and the outgoing fibers are arranged such that light from the optical fiber 1 is transmitted in that order.

The first demultiplexing portion 4 and the second demultiplexing portion 143 are optical components having a structure similar to the demultiplexing portion 4 explained in Embodiment 1. The optical orientation of the second demultiplexing portion 143 is the same as that of the first demultiplexing portion 4. That is to say, the first reciprocal lattice vector and the second reciprocal lattice vector of the second demultiplexing portion 143 are parallel to the first reciprocal lattice vector and the second reciprocal lattice vector of the first demultiplexing portion 4, respectively.

The phase retarder 142 has optical characteristics similar to the phase retarder 112 explained in Embodiment 6, and has a thickness such that the difference between the phase difference of the odd-numbered wavelengths λ(2q–1) and the phase difference of the even-numbered wavelengths λ(2q) is mπ. This means the phase retarder 142 imparts a phase change on incident light, such that the light of odd-numbered wavelengths and the light of even-numbered wavelengths becomes linearly polarized perpendicularly to one another.

The TE waves and the TM waves of the odd-numbered wavelengths λ(2q–1) are multiplexed by the second demultiplexing portion 143. The multiplexing portion 144 multiplexes the TE waves and the TM waves of the even-numbered wavelengths λ(2q). Light of even-numbered wavelengths λ(2q) that has been multiplexed by the multiplexing portion 144 is input into the optical fiber 146. Light of odd-numbered wavelengths λ(2q–1) that has been multiplexed by the demultiplexing portion 143 is input into the optical fiber 147. The optical fibers 1, 146 and 147 are arranged parallel to the plane $P_{12}$ including the first reciprocal lattice vector $\alpha_1$ and the second reciprocal lattice vector $\alpha_2$ of the first demultiplexing portion 4.

Referring to FIGS. 14A and 14B, the following is an explanation of the function of the optical device 140. Unpolarized light that is input from the optical fiber 1 is separated by the first demultiplexing portion 4 into TM waves and TE waves. In this situation, the TM waves (2q) of the wavelengths λ(2q) and the TM waves (2q–1) of the wavelengths λ(2q–1) are all shifted upward in FIG. 14A, whereas the TE waves (2q) of the wavelengths λ(2q) and the TE waves (2q–1) of the wavelengths λ(2q–1) are all shifted downward in FIG. 14A.

Then, the phase retarder 142 imparts a phase difference of mπ between the TE waves and the TM waves of the wavelengths λ(2q) and the TE waves and the TM waves of the wavelengths λ(2q–1). As a result, there is a difference of 90° between the relative polarization directions of the TE waves and the TM waves of the wavelengths λ(2q) and the wavelengths λ(2q–1).

Then, the second demultiplexing portion 143 separates the TE waves (2q) and the TE waves (2q–1), whose polarization directions differ by 90°, respectively upward and downward in FIG. 14A. The second demultiplexing portion 143 similarly separates the TM waves (2q) and the TM waves (2q–1), whose polarization directions differ by 90°, respectively upward and downward in FIG. 14A.

Here, in order to let the emission position of the TE waves (2q–1) coincide with the emission position of the TM waves (2q–1), the thickness in optical axis direction of the first demultiplexing portion 4 and the second demultiplexing portion 143 are adjusted, such that their separation distances are equal. The TE waves and TM waves of the wavelengths λ(2q–1) that have been coupled by the second demultiplexing portion 143 are coupled directly into the optical fiber 147. The TE waves and TM waves of the wavelengths λ(2q) that have not been coupled by the second demultiplexing portion 143 are multiplexed by a multiplexing portion 144, and then coupled into the optical fiber 146. The multiplexing portion 144 includes a mirror 144a and a multiplexer 144b. Thus, optical signals having a spectrum of constant wavelength intervals are separated into optical signals of even wavelengths and optical signals of odd wavelengths.

It should be noted that the separation direction of the TE waves and the TM waves in the first demultiplexing portion 4 and the second demultiplexing portion 142 is determined by the reciprocal lattice vectors of the demultiplexing portions. Therefore, the separation directions of the waves and the waves that are multiplexed by the multiplexing portion 144 can be altered with the configuration and orientation of the demultiplexing portions. FIG. 15A shows an optical device 150, in which the separation directions of the waves and the waves that are multiplexed by the multiplexing portion 144 have been altered. FIG. 15B shows the polarization state of the light emitted from the various optical components of the optical device 150.

The second demultiplexing portion 151 of the optical device 150 is the same as the second demultiplexing portion 143, except that its orientation has been altered. In the optical device 150, the angle that is defined by the first reciprocal lattice vector $\alpha_1$ of the first demultiplexing portion 4 and the first reciprocal lattice vector of the second demultiplexing portion 151 is the same as the angle defined by the first reciprocal lattice vector $\alpha_1$ and the second reciprocal lattice vector $\alpha_2$ of the first demultiplexing portion 4.

As shown in FIG. 15A, the shifting direction of the light in the second demultiplexing portion 151 in the optical device 150 is opposite to the shifting direction in FIG. 14A. As a result, the TE waves (2q) and the TM waves (2q) of the wavelengths (2q) are multiplexed by the second demultiplexing portion 151 and inputted into the optical fiber 146, whereas the TE waves (2q–1) and the TM waves (2q–1) of the wavelengths (2q–1), which are not multiplexed by the second demultiplexing portion 151, are multiplexed by the multiplexing portion 144 and inputted into the optical fiber 147.

Embodiment 8

Figure 16:
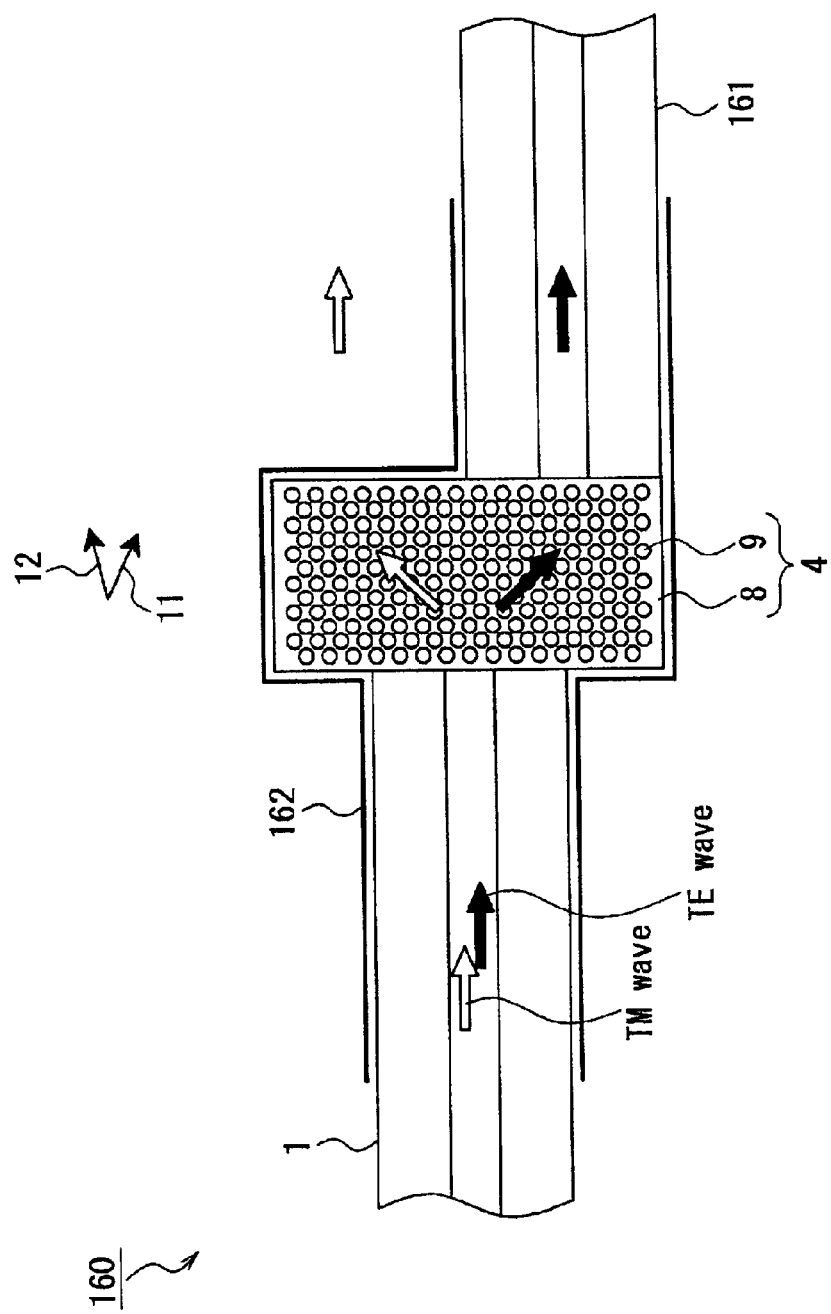
FIG. 16 schematically illustrates the configuration and function of yet another optical device of the present invention.

Embodiment 8 illustrates a polarizer as an example of an optical device according to the present invention. FIG. 16 schematically illustrates the configuration of the optical device 160 of Embodiment 8.

The optical device 160 includes an ingoing optical fiber 1, a first demultiplexing portion 4, an outgoing optical fiber 161 and a guide 162. The guide 162 fixes the relative position of the optical fiber 1, the demultiplexing portion 4, and the optical fiber 161. The demultiplexing portion 4 is an optical member having a structure similar to the demultiplexing portion 4 explained in Embodiment 1.

The demultiplexing portion 4 separates the TE waves and TM waves that are inputted from the optical fiber 1. Either the TE waves or the TM waves that are separated by the demultiplexing portion 4 enter the optical fiber 161, which is an optical output portion. FIG. 16 illustrates the case in which the TE waves enter the optical fiber 161. In FIG. 16, the TM waves that do not enter the optical fiber 161 are separated in the forward direction, but it should be noted that it is also possible that the TM waves are separated in backward direction.

Embodiment 9

Figure 18A:
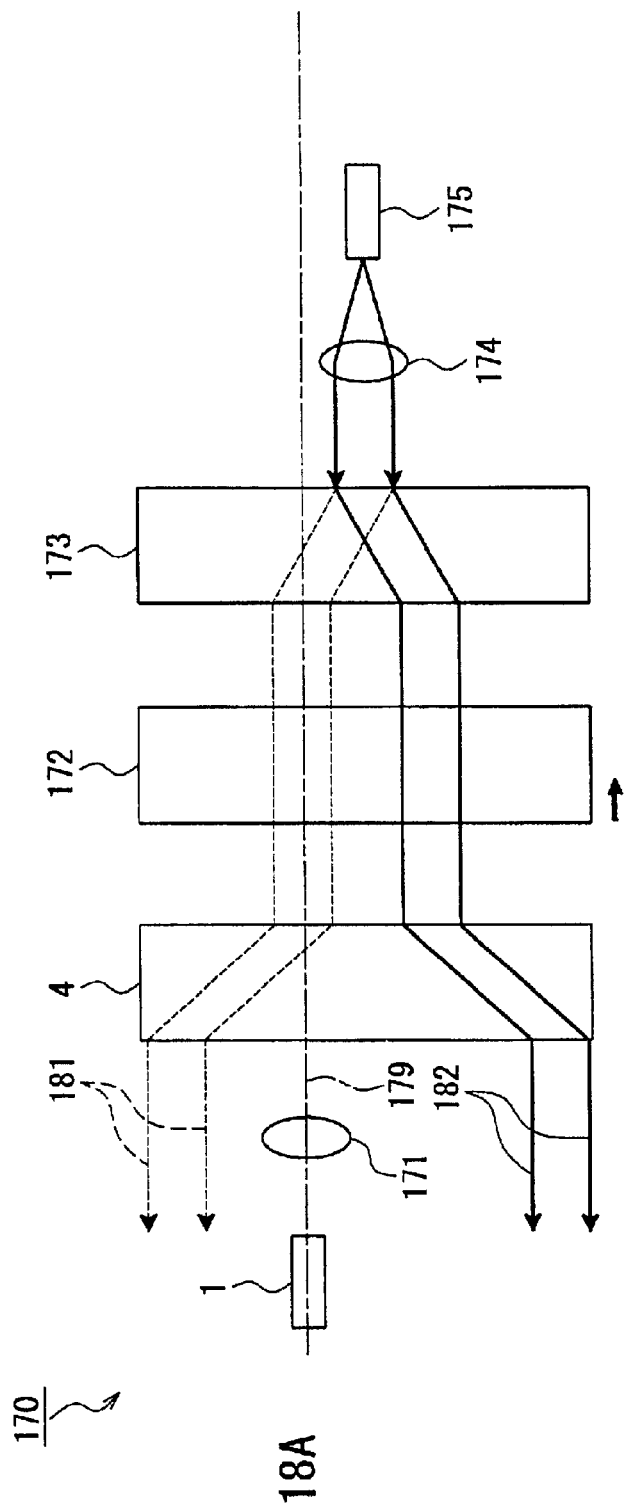
FIG. 18A schematically illustrates the light path of return light, and FIG. 18B schematically illustrates the polarization state of return light in the optical device shown in FIG. 17A.
Figure 18B:
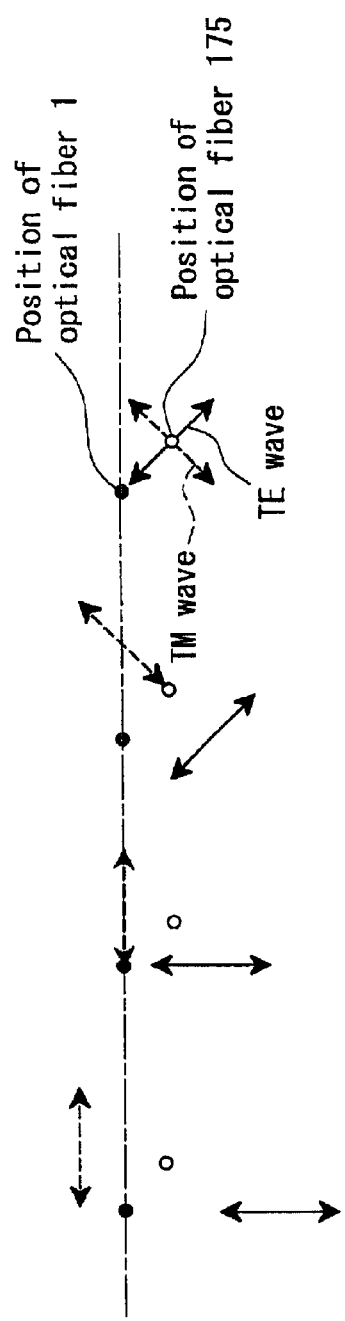

Embodiment 9 illustrates a polarization-dependent isolator as an example of an optical device according to the present invention. FIG. 17A schematically illustrates the configuration of the optical device 170 of Embodiment 9 and the light path of forward light. FIG. 17B shows the polarization state of forward light emitted from the various components. FIG. 18A shows the light path of return light, and FIG. 18B shows the polarization state of the return light.

The optical device 170 includes an ingoing optical fiber 1, an ingoing lens 171, a first demultiplexing portion 4, a Faraday crystal 172, a second demultiplexing portion 173, an outgoing lens 174 and an outgoing optical fiber 175. The optical device 170 further includes a magnetic field generator (not shown in the drawings) for applying a magnetic field H176 that saturates the rotation angle of the Faraday crystal 172. The lens 171, the first demultiplexing portion 4, the Faraday crystal 172, the second demultiplexing portion 173, the lens 174, and the optical fiber 175 are arranged such that light from the optical fiber 1 is transmitted in that order.

The first demultiplexing portion 4 and the second demultiplexing portion 173 are optical members having a structure similar to the demultiplexing portion 4 explained in Embodiment 1. These two demultiplexing portions are optically displaced by 45° relative to one another, around the optical axis 179. That is to say, the plane including the first reciprocal lattice vector and the second reciprocal lattice vector of the first demultiplexing portion 4, and the optical axis 179 and the plane including the first reciprocal lattice vector and the second reciprocal lattice vector of the second demultiplexing portion 173, and the optical axis 179 define an angle of 45° around the optical axis 179. Furthermore, these two demultiplexing portions are arranged such that the angle defined by the first reciprocal lattice vector of the first demultiplexing portion 4 and the first reciprocal lattice vector of the second demultiplexing portion 173 is the same as the angle defined by the first reciprocal lattice vector $\alpha_1$ and the second reciprocal lattice vector $\alpha_2$ of the first demultiplexing portion 4.

The following is an explanation of the function of the optical device 170, with reference to the drawings. Forward light (unpolarized light) that enters from the optical fiber 1 is separated by the first demultiplexing portion 4 into a TM wave 177 and a TE wave 178, as shown in FIGS. 17A and 17B. Then, the TM wave 177 and the TE wave 178 are rotated 45° by the Faraday crystal 172. Still separated, the TM wave 177 and the TE wave 178 are emitted from the second demultiplexing portion 173. The TE wave 178 enters the optical fiber 175, which is disposed at the position at which the TE wave 178 is emitted. The TM wave 177 does not enter the optical fiber.

On the other hand, the return light that enters from the optical fiber 175 is separated by the second demultiplexing portion 173 into a TM wave 181 and a TE wave 182 as shown in FIGS. 18A and 18B. The TM wave 181 and the TE wave 182 are rotated 45° each by the Faraday crystal 172. Then, the TM wave 181 and the TE wave 182 are shifted by the first demultiplexing portion 4 in a direction further away from the optical axis 179. As a result, the TM wave 181 and the TE wave 182 are not coupled into the optical fiber 1. Consequently, with the optical device 170, light is transmitted only in one direction.

It should be noted that Embodiment 9 has been explained for the case in which the TE waves enter the optical fiber 175 serving as the optical output portion, but it is also possible that the TM waves enter the optical fiber 175.

Embodiment 10

Figure 19A:
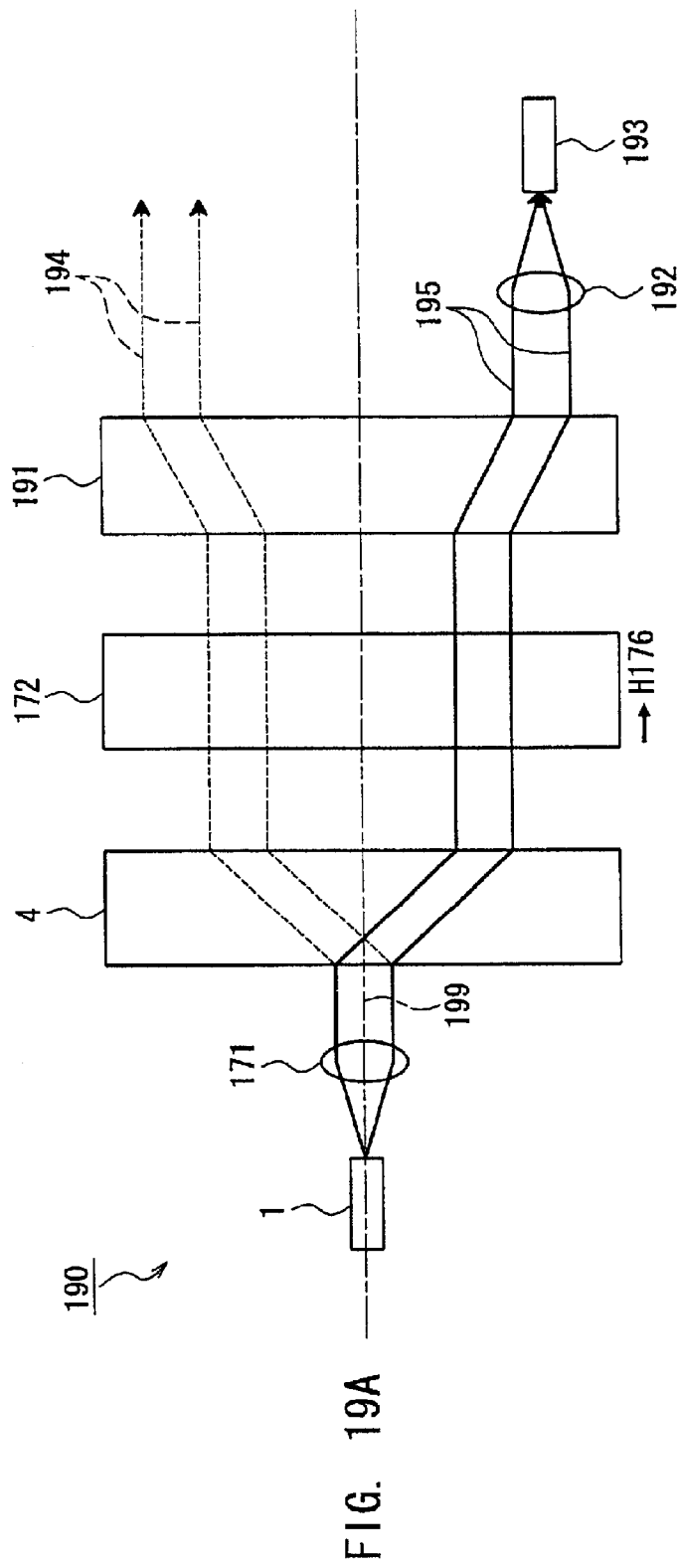
FIG. 19A schematically illustrates yet another configuration of the optical device of the present invention, and FIG. 19B schematically illustrates the polarization state of forward light therein.
Figure 19B:
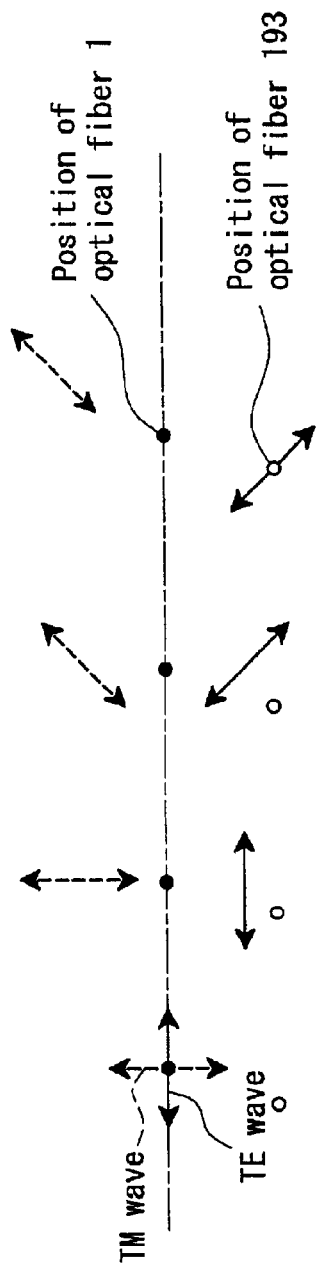
Figure 21:
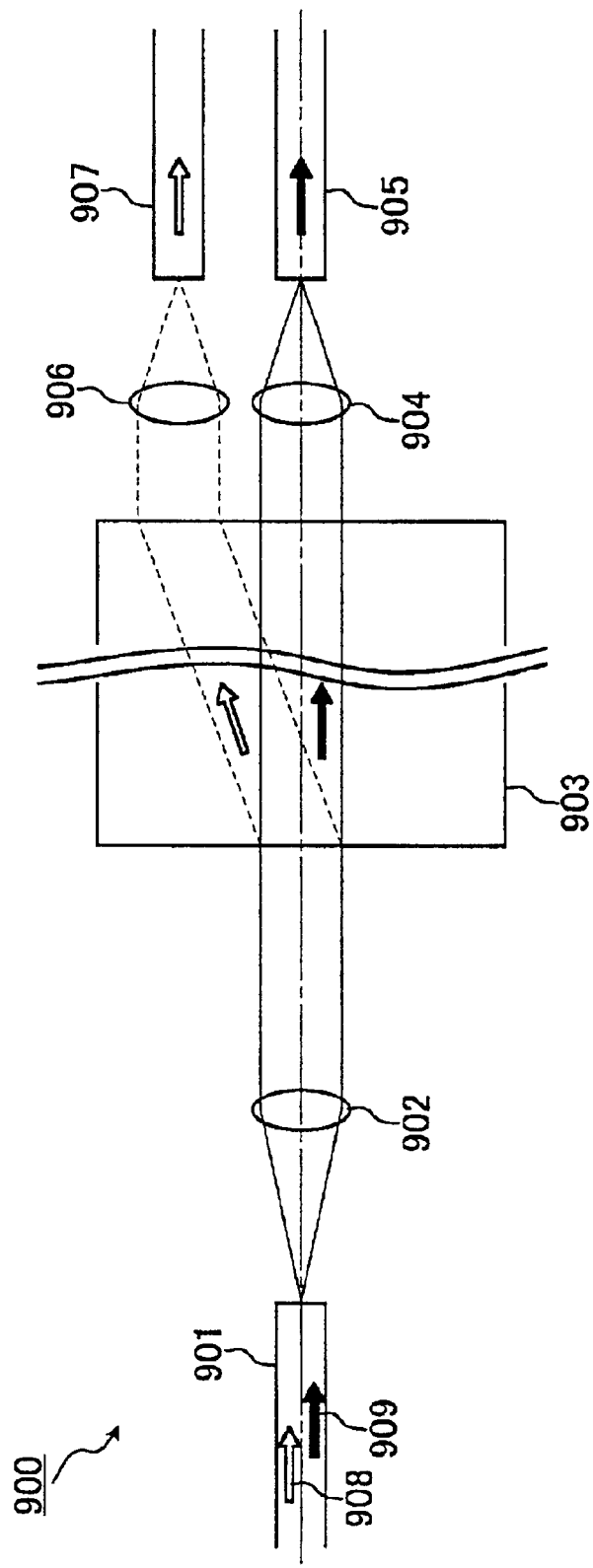
FIG. 21 schematically illustrates the configuration and function of a conventional optical device.
Figure 22:
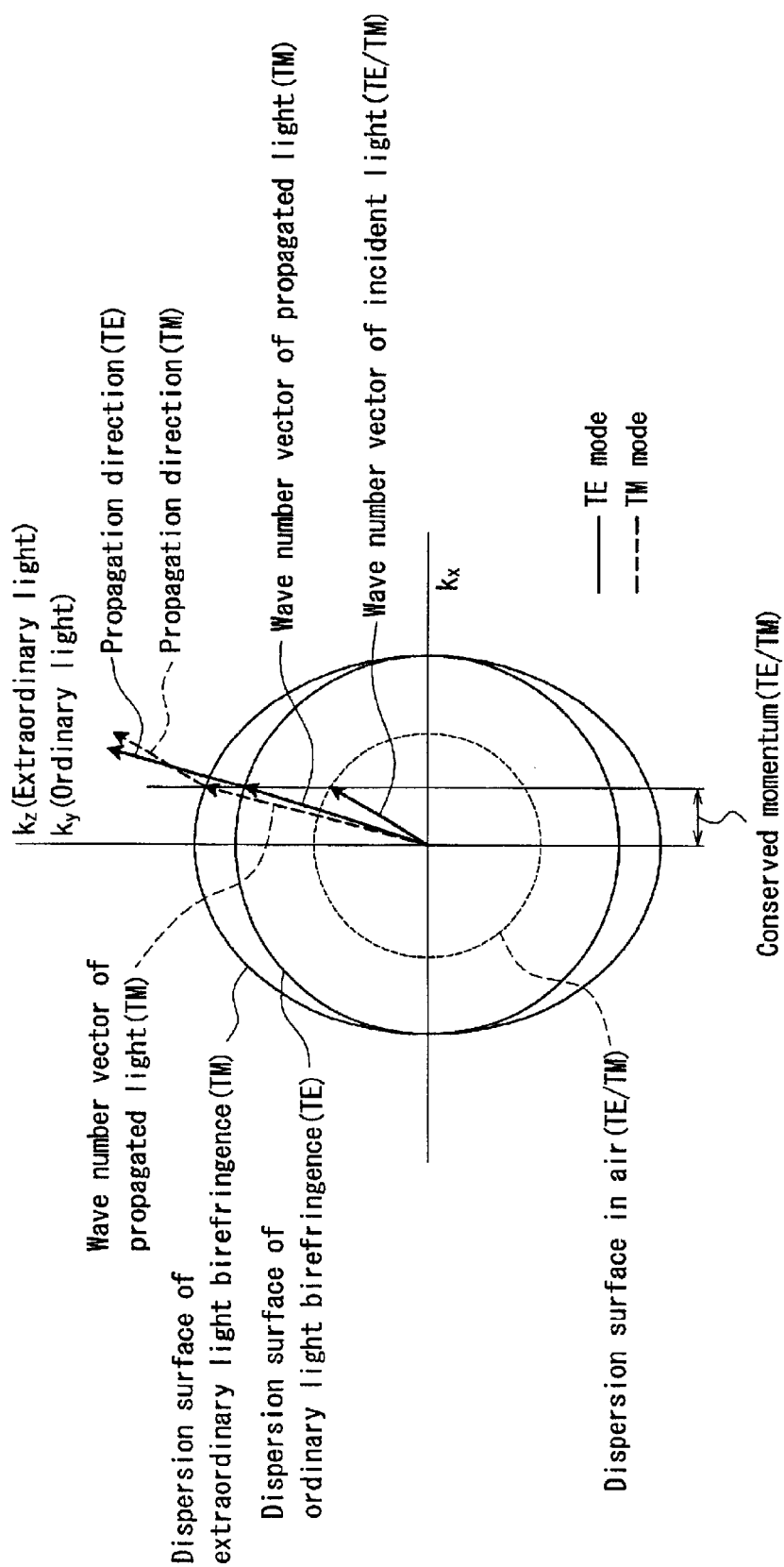
FIG. 22 illustrates an example of the dispersion surfaces and propagation directions of light in the birefringent material used in the conventional optical device.

Embodiment 10 illustrates a polarization-dependent isolator as an example of an optical device according to the present invention. FIG. 19A schematically illustrates the configuration of an optical device 190 of Embodiment 10 and the light path of forward light. FIG. 19B shows the polarization state of forward light emitted from the various components. FIG. 20A shows the light path of return light, and FIG. 20B shows the polarization state of the return light.

The optical device 190 includes an ingoing optical fiber 1, an ingoing lens 171, a first demultiplexing portion 4, a Faraday crystal 172, a second demultiplexing portion 191, an outgoing lens 192, and an outgoing optical fiber 193. The optical device 190 further includes a magnetic field generator (not shown in the drawings) for applying a magnetic field H176 that saturates the rotation angle of the Faraday crystal 172. Compared to the optical device 170, the optical device 190 differs only in the arrangement of the second demultipexing portion, the outgoing lens, and the outgoing optical fiber, so that duplicate explanations have been omitted.

The first demultiplexing portion 4 and the second demultiplexing portion 191 are optically displaced at an angle of 45° around the optical axis 199. That is to say, the plane including the first reciprocal lattice vector and the second reciprocal lattice vector of the first demultiplexing portion 4 and the optical axis 199 and the plane including the first reciprocal lattice vector and the second reciprocal lattice vector of the second demultiplexing portion 191 and the optical axis 199 define an angle of 45°. Furthermore, these two demultiplexing portions are arranged such that the first reciprocal lattice vector of the first demultiplexing portion 4 and the first reciprocal lattice vector of the second demultiplexing portion 191 are parallel.

The following is an explanation of the function of the optical device 190, with reference to the drawings. Forward light (unpolarized light) that enters from the optical fiber 1 is separated by the first demultiplexing portion 4 into a TM wave 194 and a TE wave 195, as shown in FIGS. 19A and 19B. Then, the TM wave 194 and the TE wave 195 are rotated 45° by the Faraday crystal 172. Still separated, the TM wave 194 and the TE wave 195 are emitted from the second demultiplexing portion 191. The TE wave 195 enters the optical fiber 193, which is disposed at the position at which the TE wave 195 is emitted. The TM wave 194 does not enter the optical fiber.

On the other hand, the return light (unpolarized light) that enters from the optical fiber 193 is separated by the second demultiplexing portion 191 into a TM wave 201 and a TE wave 202 as shown in FIGS. 20A and 20B. The TM wave 201 and the TE wave 202 are rotated 45° by the Faraday crystal 172. Then, the TM wave 201 and the TE wave 202 pass through the first demultiplexing portion 4 while still being spaced from the optical axis 199. As a result, the TM wave 201 and the TE wave 202 are not coupled into the optical fiber 1. Consequently, with the optical device 190, light is transmitted only in one direction.

It should be noted that in the optical device 190, it is also possible to input TM waves into the optical fiber 193. In that case, the optical fiber 193 should be arranged at the position at which the TM wave is emitted, such that the TE wave is not received.

Furthermore, in order to avoid the influence of return light at the ingoing planes of the optical components, it is also possible to tilt the ingoing planes of the optical components, so that they are not perpendicular with respect to the optical axis.

Furthermore, it is also possible to layer the demultiplexing portions on the end faces of components that are adjacent on the optical axis. In that case, it is possible to manufacture the demultiplexing portions by forming depressions or grooves on the end faces of adjacent components.

As explained in the foregoing, the optical device of the present invention can be used as a demultiplexing portion, with which the separation angle between a TE wave and a TM wave can be made about 180°. Thus, TE waves and TM waves can be separated adequately at a propagation distance at which the influence of diffraction can be ignored, and the optical device can be made smaller. Furthermore, when a plurality of wavelengths with a constant wavelength interval are used, then the wave number difference between TE waves and TM waves of neighboring wavelengths can be made almost the same, so that it is possible to align the phase differences of TE waves and TM waves of separated neighboring wavelengths. Thus, the optical device of the present invention, can be applied to a variety of devices The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. An optical device comprising:
a first optical member separating an incident light of wavelength $\lambda$ into a TE wave and a TM wave; and
an optical input portion, which inputs the incident light into the first optical member;
wherein the first optical member has a periodically changing refractive index;
wherein an angle defined by a first reciprocal lattice vector $\alpha_1$ and a second reciprocal lattice vector $\alpha_2$ of the first optical member at the wavelength $\lambda$ is not larger than 90°;
wherein, in the direction of the first reciprocal lattice vector $\alpha_1$, the wave number of the TE wave is larger than the wave number of the TM wave;
wherein, in the direction of the second reciprocal lattice vector $\alpha_2$, the wave number of the TE wave is smaller than the wave number of the TM wave;
wherein the optical input portion inputs the incident light in a direction that is parallel to a plane $P_{12}$ including the first reciprocal lattice vector $\alpha_1$ and the second reciprocal lattice vector $\alpha_2$; and
wherein a size of the wave number of the TE wave and the wave number of the TM wave alternate in the direction of the first reciprocal lattice vector $\alpha_1$ and in the direction of the second reciprocal lattice vector $\alpha_2$.

2. The optical device according to claim 1, wherein the first optical member has a structure in which a plurality of materials of different refractive indices are arranged with a constant period in a two-dimensional direction.

3. The optical device according to claim 1,
wherein the first optical member includes a first material and a plurality of particles disposed inside the first material;
wherein the particles are made of a second material that has a different refractive index from the first material; and
wherein the particles are disposed with a constant period inside the first material.

4. The optical device according to claim 1,
wherein the first optical member includes a first material and a plurality of columnar portions disposed inside the first material;
wherein the plurality of columnar portions are made of a second material that has a different refractive index from the first material;
wherein the center axes of the columnar portions are parallel to one another and perpendicular to the incidence direction of the incident light; and
wherein the plurality of columnar portions are arranged with a constant period.

5. The optical device according to claim 1,
wherein the first optical member includes a plurality of first layers and a plurality of second layers that are layered in alternation in the incidence direction of the incident light; and
wherein the first layers are made of a first material, and the second layers are made of a second material that has a different refractive index from the first material.

6. The optical device according to claim 1,
further comprising an optical output portion receiving light that is emitted from the first optical member;
wherein the optical input portion comprises an optical fiber $F(0)$;
wherein the optical output portion comprises optical fibers $F(1)$ and $F(2)$;
wherein the optical fibers $F(0)$ and the optical fibers $F(1)$ and $F(2)$ are arranged parallel to the plane $P_{12}$; and
wherein the TE wave that is emitted from the first optical member is incident on an end portion of the optical fiber $F(1)$ and the TM wave that is emitted from the first optical member is incident on an end portion of the optical fiber $F(2)$.

7. The optical device according to claim 1,
further including a second optical member;
wherein the first optical member and the second optical member are arranged such that light that entered from the optical input portion is transmitted first through the first optical member and then through the second optical member;
wherein the second optical member has a periodically changing refractive index;
wherein an angle defined by a first reciprocal lattice vector $\beta_1$ and a second reciprocal lattice vector $\beta_2$ of the second optical member at the wavelength $\lambda$ is not larger than 90°;
wherein, in the direction of the first reciprocal lattice vector $\beta_1$, the wave number of TE waves is larger than the wave number of TM waves;
wherein, in the direction of the second reciprocal lattice vector $\beta_2$, the wave number of TE waves is smaller than the wave number of TM waves; and
wherein a plane including the first reciprocal lattice vector $\alpha_1$, the second reciprocal lattice vector $\alpha_2$ and the optical axis of incident light and a plane including the first reciprocal lattice vector $\beta_1$, the second reciprocal lattice vector $\beta_2$ and the optical axis define an angle of 45° around the optical axis.

8. The optical device according to claim 7, wherein the second optical member has the same structure as the first optical member.

9. The optical device according to claim 7,
further comprising an optical output portion receiving light that is emitted from the second optical member;
wherein the emitted light includes a first and a second TM wave and a first and a second TE wave;
wherein the optical input portion comprises an optical fiber $F(0)$;
wherein the optical output portion comprises optical fibers $F(1)$, $F(2)$, $F(3)$ and $F(4)$;
wherein the optical fiber $F(0)$ and the optical fibers $F(1)$, $F(2)$, $F(3)$ and $F(4)$ are arranged parallel to the plane $P_{12}$; and wherein the first TM wave is incident on an end portion of the optical fiber F(1), the second TM wave is incident on an end portion of the optical fiber F(2), the first TE wave is incident on an end portion of the optical fiber F(3), and the second TE wave is incident on an end portion of the optical fiber F(4).

10. The optical device according to claim 1, further including second to n-th optical members (wherein n is an integer of 3 or larger);

wherein the k-th optical member (wherein k is an integer between 2 and n) is arranged such that it receives light inputted from the optical input portion and outputted from the (k−1)-th optical member;

wherein the second to n-th optical members have a periodically changing refractive index;

wherein an angle defined by a first reciprocal lattice vector $k_1$, and a second reciprocal lattice vector $k_2$ of the k-th optical member at the wavelength $\lambda$ is not larger than 90°;

wherein, in the direction of the first reciprocal lattice vector $k_1$, the wave number of TE waves is larger than the wave number of TM waves; and wherein, in the direction of the second reciprocal lattice vector $k_2$, the wave number of TE waves is smaller than the wave number of TM waves.

11. The optical device according to claim 10, wherein the second to n-th optical members have the same structure as the first optical member.

12. The optical device according to claim 10, wherein, when plane $k_{12}$ is the plane including the first reciprocal lattice vector $k_1$, the second reciprocal lattice vector $k_2$ and the optical axis of the incident light, and plane $(k-1)_{12}$ is the plane including the first reciprocal lattice vector $(k-1)_1$ of the (k−1)-th optical member, the second reciprocal lattice vector $(k-1)_2$ of the (k−1)-th optical member and the optical axis, then the plane $k_{12}$ and the plane $(k-1)_{12}$ define an angle of 45° around the optical axis.

13. The optical device according to claim 12, further comprising $2^n$ outgoing optical fibers receiving light that is emitted from the n optical members;

wherein the emitted light includes first to $(2^{n-1})$-th TE waves and first to $(2^{n-1})$-th TM waves;

wherein the optical input portion comprises an optical fiber F(0);

wherein the optical fiber F(0) and the $2^n$ outgoing optical fibers are arranged parallel to the plane $P_{12}$; and wherein the first to $(2^{n-1})$-th TE waves and the first to $(2^{n-1})$-th TM waves are incident on end portions of different outgoing optical fibers.

14. The optical device according to claim 10, further comprising a Faraday crystal, an outgoing optical fiber F(1), and a magnetic field generator for applying a magnetic field that saturates the rotation angle of the Faraday crystal;

wherein said n is 3, so that the optical device includes second and third optical members;

wherein the first optical member, the Faraday crystal, the second optical member, the third optical member and the optical fiber F(1) are arranged such that light that enters from the optical input portion is transmitted in that order;

wherein the angle defined by first reciprocal lattice vector $\alpha_1$ and the first reciprocal lattice vector of the second optical member is 45°;

wherein the angle defined by the first reciprocal lattice vector of the second optical member and the first reciprocal lattice vector of the third optical member is 90°.

15. The optical device according to claim 1, further comprising a Faraday crystal, a polarization-rotating crystal, a second optical member, an outgoing optical fiber F(1), and a magnetic field generator for applying a magnetic field that saturates the rotation angle of the Faraday crystal;

wherein the first optical member, the Faraday crystal, the polarization-rotating crystal, the second optical member and the optical fiber F(1) are arranged such that light that enters from the optical input portion is transmitted in that order;

wherein the second optical member has a periodically changing refractive index;

wherein an angle defined by a first reciprocal lattice vector $\beta_1$ and a second reciprocal lattice vector $\beta_2$ of the second optical member at the wavelength $\lambda$ is not larger than 90°;

wherein, in the direction of the first reciprocal lattice vector $\beta_1$, the wave number of the TE wave is larger than the wave number of the TM wave;

wherein, in the direction of the second reciprocal lattice vector $\beta_2$, the wave number of the TE wave is smaller than the wave number of the TM wave; and wherein the first reciprocal lattice vector $\alpha_1$ and the first reciprocal lattice vector $\beta_1$ are parallel.

16. The optical device according to claim 1, further comprising a phase retarder and an optical output portion;

wherein the first optical member, the phase retarder and the optical output portion are arranged such that light that enters from the optical input portion is transmitted in that order;

wherein the optical input portion inputs p light beams (wherein p is an integer greater than 1), whose wavelengths range from a wavelength $\lambda(1)$ equal to $\lambda$ and increase at constant wavelength intervals to a wavelength $\lambda(p)$, in a direction that is parallel to the plane $P_{12}$; and wherein the phase retarder imparts a difference in polarization between light beams of odd-numbered wavelengths and light beams of even-numbered wavelengths.

17. The optical device according to claim 16, wherein the phase retarder has a periodically changing refractive index;

wherein, when x is the difference between the wave number of the first reciprocal lattice vector and the wave number of the second reciprocal lattice vector of the phase retarder at the odd-numbered wavelengths, and y is the difference between the wave number of the first reciprocal lattice vector and the wave number of the second reciprocal lattice vector at the even-numbered wavelengths, then the difference between x and y is constant; and wherein the plane $P_{12}$ and the plane including the first reciprocal lattice vector and the second reciprocal lattice vector of the phase retarder define an angle of 45°.

18. The optical device according to claim 16, further comprising a second optical member having the same dispersion surface as the first optical member, and a multiplexing portion;

wherein the first optical member, the phase retarder, the second optical member, the multiplexing portion, and the optical output portion are arranged such that light entering from the optical input portion is transmitted in that order;

wherein the phase retarder imparts a phase change, such that light of odd-numbered wavelengths and light of even-numbered wavelengths become linearly polarized perpendicularly to one another;

wherein the first and the second reciprocal lattice vector of the second optical member are parallel to the first and the second reciprocal lattice vectors $\alpha_1$ and $\alpha_2$, respectively;

wherein the multiplexing portion multiplexes TE waves and TM waves of either odd-numbered wavelength light or of even-numbered wavelength light;

wherein the optical input portion comprises an optical fiber F(0);

wherein the optical output portion includes an optical fiber F(1) into which light of odd-numbered wavelengths is input, and an optical fiber F(2) into which light of even-numbered wavelengths is input; and wherein the optical fiber F(0), the optical fiber F(1) and the optical fiber F(2) are arranged parallel to the plane $P_{12}$.

19. The optical device according to claim 16, further comprising a second optical member having the same dispersion surface as the first optical member, and a multiplexing portion;

wherein the first optical member, the phase retarder, the second optical member, the multiplexing portion, and the optical output portion are arranged such that light entering from the optical input portion is transmitted in that order;

wherein the phase retarder imparts a phase change, such that light of odd-numbered wavelengths and light of even-numbered wavelengths become linearly polarized perpendicularly to one another;

wherein the angle defined by the first reciprocal lattice vector of the second optical member and the first reciprocal lattice vector $\alpha_1$ is the same as the angle defined by the first reciprocal lattice vector $\alpha_1$ and the second reciprocal lattice vector $\alpha_2$;

wherein the multiplexing portion multiplexes TE waves and TM waves of either odd-numbered wavelength light or of even-numbered wavelength light;

wherein the optical input portion comprises an optical fiber F(0);

wherein the optical output portion includes an optical fiber F(1) into which light of odd-numbered wavelengths is input, and an optical fiber F(2) into which light of even-numbered wavelengths is input; and wherein the optical fiber F(0), the optical fiber F(1) and the optical fiber F(2) are arranged parallel to the plane $P_{12}$.

20. The optical device according to claim 1, further comprising an optical output portion for receiving light that is emitted from the first optical member;

wherein the optical input portion comprises an optical fiber;

wherein the optical output portion comprises an optical fiber for receiving either the TE waves or the TM waves that are emitted from the first optical member.

21. The optical device according to claim 1, further comprising a Faraday crystal, a second optical member having a dispersion surface that is the same as that of the first optical member, an optical output portion, and a magnetic field generator for applying a magnetic field that saturates the rotation angle of the Faraday crystal;

wherein the first optical member, the Faraday crystal, the second optical member, and the optical output portion are arranged such that light entering from the optical input portion is transmitted in that order;

wherein the plane including the first reciprocal lattice vector $\alpha_1$, the second reciprocal lattice vector $\alpha_2$ and the optical axis of the incident light and the plane including the first reciprocal lattice vector $\beta_1$ and the second reciprocal lattice vector $\beta_2$ of the second optical member and the optical axis define an angle of 45° around the optical axis;

wherein the angle defined by the first reciprocal lattice vector $\alpha_1$ and the first reciprocal lattice vector $\beta_1$ is the same as the angle defined by the first reciprocal lattice vector $\alpha_1$ and the second reciprocal lattice vector $\alpha_2$; and wherein the optical output portion comprises an optical fiber receiving only either the TE waves or the TM waves emitted by the second optical member.

22. The optical device according to claim 1, further comprising a Faraday crystal, a second optical member having a dispersion surface that is the same as that of the first optical member, an optical output portion, and a magnetic field generator for applying a magnetic field that saturates the rotation angle of the Faraday crystal;

wherein the first optical member, the Faraday crystal, the second optical member, and the optical output portion are arranged such that light entering from the optical input portion is transmitted in that order;

wherein the plane including the first reciprocal lattice vector $\alpha_1$, the second reciprocal lattice vector $\alpha_2$ and the optical axis of the incident light and the plane including the first reciprocal lattice vector $\beta_1$ and the second reciprocal lattice vector $\beta_2$ of the second optical member and the optical axis define an angle of 45° around the optical axis;

wherein the first reciprocal lattice vector $\alpha_1$ and the first reciprocal lattice vector $\beta_1$ are parallel; and wherein the optical output portion comprises an optical fiber receiving only either the TE waves or the TM waves emitted by the second optical member.

23. An optical device comprising:

a first optical member separating an incident light of wavelength λ into a TE wave and a TM wave;

an optical input portion, which inputs the incident light into the first optical member; and a second optical member;

wherein the first optical member has a periodically changing refractive index;

wherein the second optical member has a periodically changing refractive index;

wherein the first optical member and the second optical member are arranged such that light that entered from the optical input portion is transmitted first through the first optical member and then through the second optical member;

wherein an angle defined by a first reciprocal lattice vector $\alpha_1$ and a second reciprocal lattice vector $\alpha_2$ of the first optical member at the wavelength $\lambda$ is not larger than 90°;

wherein, in the direction of the first reciprocal lattice vector $\alpha_1$, the wave number of the TE wave is larger than the wave number of the TM wave;

wherein, in the direction of the second reciprocal lattice vector $\alpha_2$, the wave number of the TE wave is smaller than the wave number of the TM wave;

wherein the optical input portion inputs the incident light in a direction that is parallel to a plane $P_{12}$ including the first reciprocal lattice vector $\alpha_1$ and the second reciprocal lattice vector $\alpha_2$;

wherein an angle defined by a first reciprocal lattice vector $\beta_1$ and a second reciprocal lattice vector $\beta_2$ of the second optical member at the wavelength $\lambda$ is not larger than 90°;

wherein, in the direction of the first reciprocal lattice vector $\beta_2$, the wave number of TE waves is larger than the wave number of TM waves;

wherein, in the direction of the second reciprocal lattice vector $\beta_2$, the wave number of TE waves is smaller than the wave number of TM waves; and wherein a plane including the first reciprocal lattice vector $\alpha_1$, the second reciprocal lattice vector $\alpha_2$ and the optical axis of incident light and a plane including the first reciprocal lattice vector $\beta_1$, the second reciprocal lattice vector $\beta_2$ and the optical axis define an angle of 45° around the optical axis.

24. The optical device according to claim 23, wherein the second optical member has the same structure as the first optical member.

25. The optical device according to claim 23, further comprising an optical output portion receiving light that is emitted from the second optical member;

wherein the emitted light includes a first and a second TM wave and a first and a second TE wave;

wherein the optical input portion comprises an optical fiber F(0);

wherein the optical output portion comprises optical fibers F(1), F(2), F(3) and F(4);

wherein the optical fiber F(0) and the optical fibers F(1), F(2), F(3) and F(4) are arranged parallel to the plane $P_{12}$; and wherein the first TM wave is incident on an end portion of the optical fiber F(1), the second TM wave is incident on an end portion of the optical fiber F(2), the first TE wave is incident on an end portion of the optical fiber F(3), and the second TE wave is incident on an end portion of the optical fiber F(4).

26. The optical device according to claim 23, further including second to n-th optical members (wherein n is an integer of 3 or larger);

wherein the k-th optical member (wherein k is an integer between 2 and n) is arranged such that it receives light inputted from the optical input portion and outputted from the (k−1)-th optical member;

wherein the second to n-th optical members have a periodically changing refractive index;

wherein an angle defined by a first reciprocal lattice vector $k_1$ and a second reciprocal lattice vector $k_2$ of the k-th optical member at the wavelength $\lambda$ is not larger than 90°;

wherein, in the direction of the first reciprocal lattice vector $k_1$, the wave number of TE waves is larger than the wave number of TM waves; and wherein, in the direction of the second reciprocal lattice vector $k_2$, the wave number of TE waves is smaller than the wave number of TM waves.

27. The optical device according to claim 26, wherein the second to n-th optical members have the same structure as the first optical member.

28. The optical device according to claim 26, wherein, when plane $k_{12}$ is the plane including the first reciprocal lattice vector $k_1$, the second reciprocal lattice vector $k_2$ and the optical axis of the incident light, and plane $(k-1)_{12}$ is the plane including the first reciprocal lattice vector $(k-1)_1$ of the (k−1)-th optical member, the second reciprocal lattice vector $(k-1)_2$ of the (k−1)-th optical member and the optical axis, then the plane $k_{12}$ and the plane $(k-1)_{12}$ define an angle of 45° around the optical axis.

29. The optical device according to claim 28, further comprising $2^n$ outgoing optical fibers receiving light that is emitted from the n optical members;

wherein the emitted light includes first to $(2^{n-1})$-th TE waves and first to $(2^{n-1})$-th TM waves;

wherein the optical input portion comprises an optical fiber F(0);

wherein the optical fiber F(0) and the $2^n$ outgoing optical fibers are arranged parallel to the plane $P_{12}$; and wherein the first to $(2^{n-1})$-th TE waves and the first to $(2^{n-1})$-th TM waves are incident on end portions of different outgoing optical fibers.

30. The optical device according to claim 26, further comprising a Faraday crystal, an outgoing optical fiber F(1), and a magnetic field generator for applying a magnetic field that saturates the rotation angle of the Faraday crystal;

wherein said n is 3, so that the optical device includes second and third optical members;

wherein the first optical member, the Faraday crystal, the second optical member, the third optical member and the optical fiber F(1) are arranged such that light that enters from the optical input portion is transmitted in that order;

wherein the angle defined by first reciprocal lattice vector $\alpha_1$, and the first reciprocal lattice vector of the second optical member is 45°;

wherein the angle defined by the first reciprocal lattice vector of the second optical member and the first reciprocal lattice vector of the third optical member is 90°.

31. The optical device according to claim 23, further comprising a Faraday crystal, a polarization-rotating crystal, a second optical member, an outgoing optical fiber F(1), and a magnetic field generator for applying a magnetic field that saturates the rotation angle of the Faraday crystal;

wherein the first optical member, the Faraday crystal, the polarization-rotating crystal, the second optical member and the optical fiber F(1) are arranged such that light that enters from the optical input portion is transmitted in that order;

wherein the second optical member has a periodically changing refractive index;

wherein an angle defined by a first reciprocal lattice vector $\beta_1$ and a second reciprocal lattice vector $\beta_2$ of the second optical member at the wavelength λ is not larger than 90°;

wherein, in the direction of the first reciprocal lattice vector $\beta_1$, the wave number of the TE wave is larger than the wave number of the TM wave;

wherein, in the direction of the second reciprocal lattice vector $\beta_2$, the wave number of the TE wave is smaller than the wave number of the TM wave; and wherein the first reciprocal lattice vector $\alpha_1$ and the first reciprocal lattice vector $\beta_1$ are parallel.

32. The optical device according to claim 23, further comprising a phase retarder and an optical output portion;

wherein the first optical member, the phase retarder and the optical output portion are arranged such that light that enters from the optical input portion is transmitted in that order;

wherein the optical input portion inputs p light beams (wherein p is an integer greater than 1), whose wavelengths range from a wavelength λ (1) equal to λ and increase at constant wavelength intervals to a wavelength λ (p), in a direction that is parallel to the plane $P_{12}$; and wherein the phase retarder imparts a difference in polarization between light beams of odd-numbered wavelengths and light beams of even-numbered wavelengths.

33. The optical device according to claim 32, wherein the phase retarder has a periodically changing refractive index;

wherein, when x is the difference between the wave number of the first reciprocal lattice vector and the wave number of the second reciprocal lattice vector of the phase retarder at the odd-numbered wavelengths, and y is the difference between the wave number of the first reciprocal lattice vector and the wave number of the second reciprocal lattice vector at the even-numbered wavelengths, then the difference between x and y is constant; and wherein the plane $P_{12}$ and the plane including the first reciprocal lattice vector and the second reciprocal lattice vector of the phase retarder define an angle of 45°.

34. The optical device according to claim 32, further comprising a second optical member having the same dispersion surface as the first optical member, and a multiplexing portion;

wherein the first optical member, the phase retarder, the second optical member, the multiplexing portion, and the optical output portion are arranged such that light entering from the optical input portion is transmitted in that order;

wherein the phase retarder imparts a phase change, such that light of odd-numbered wavelengths and light of even-numbered wavelengths become linearly polarized perpendicularly to one another;

wherein the first and the second reciprocal lattice vector of the second optical member are parallel to the first and the second reciprocal lattice vectors $\alpha_1$ and $\alpha_2$, respectively;

wherein the multiplexing portion multiplexes TE waves and TM waves of either odd-numbered wavelength light or of even-numbered wavelength light;

wherein the optical input portion comprises an optical fiber F(0);

wherein the optical output portion includes an optical fiber F(1) into which light of odd-numbered wavelengths is input, and an optical fiber F(2) into which light of even-numbered wavelengths is input; and wherein the optical fiber F(0), the optical fiber F(1) and the optical fiber F(2) are arranged parallel to the plane $P_{12}$.

35. The optical device according to claim 32, further comprising a second optical member having the same dispersion surface as the first optical member, and a multiplexing portion;

wherein the first optical member, the phase retarder, the second optical member, the multiplexing portion, and the optical output portion are arranged such that light entering from the optical input portion is transmitted in that order;

wherein the phase retarder imparts a phase change, such that light of odd-numbered wavelengths and light of even-numbered wavelengths become linearly polarized perpendicularly to one another;

wherein the angle defined by the first reciprocal lattice vector of the second optical member and the first reciprocal lattice vector $\alpha_1$ is the same as the angle defined by the first reciprocal lattice vector $\alpha_1$ and the second reciprocal lattice vector $\alpha_2$;

wherein the multiplexing portion multiplexes TE waves and TM waves of either odd-numbered wavelength light or of even-numbered wavelength light;

wherein the optical input portion comprises an optical fiber F(0);

wherein the optical output portion includes an optical fiber F(1) into which light of odd-numbered wavelengths is input, and an optical fiber F(2) into which light of even-numbered wavelengths is input; and wherein the optical fiber F(0), the optical fiber F(1) and the optical fiber F(2) are arranged parallel to the plane $P_{12}$.

36. The optical device according to claim 23, further comprising an optical output portion for receiving light that is emitted from the first optical member;

wherein the optical input portion comprises an optical fiber;

wherein the optical output portion comprises an optical fiber for receiving either the TE waves or the TM waves that are emitted from the first optical member.

37. The optical device according to claim 23, further comprising a Faraday crystal, a second optical member having a dispersion surface that is the same as that of the first optical member, an optical output portion, and a magnetic field generator for applying a magnetic field that saturates the rotation angle of the Faraday crystal;

wherein the first optical member, the Faraday crystal, the second optical member, and the optical output portion are arranged such that light entering from the optical input portion is transmitted in that order;

wherein the plane including the first reciprocal lattice vector $\alpha_1$, the second reciprocal lattice vector $\alpha_2$ and the optical axis of the incident light and the plane including the first reciprocal lattice vector $\beta_1$ and the second reciprocal lattice vector $\beta_2$ of the second optical member and the optical axis define an angle of 45° around the optical axis;

wherein the angle defined by the first reciprocal lattice vector $\alpha_1$ and the first reciprocal lattice vector $\beta_1$ is the same as the angle defined by the first reciprocal lattice vector $\alpha_1$ and the second reciprocal lattice vector $\alpha_2$; and wherein the optical output portion comprises an optical fiber receiving only either the TE waves or the TM waves emitted by the second optical member.

38. The optical device according to claim 23, further comprising a Faraday crystal, a second optical member having a dispersion surface that is the same as that of the first optical member, an optical output portion, and a magnetic field generator for applying a magnetic field that saturates the rotation angle of the Faraday crystal;

wherein the first optical member, the Faraday crystal, the second optical member, and the optical output portion are arranged such that light entering from the optical input portion is transmitted in that order;

wherein the plane including the first reciprocal lattice vector $\alpha_1$, the second reciprocal lattice vector $\alpha_2$ and the optical axis of the incident light and the plane including the first reciprocal lattice vector $\beta_1$ and the second reciprocal lattice vector $\beta_2$ of the second optical member and the optical axis define an angle of 45° around the optical axis;

wherein the first reciprocal lattice vector $\alpha_1$ and the first reciprocal lattice vector $\beta_1$ are parallel; and wherein the optical output portion comprises an optical fiber receiving only either the TE waves or the TM waves emitted by the second optical member.

* * * * *

UNITED STATES PATENT AND TRADEMARK OFFICE
CERTIFICATE OF CORRECTION

PATENT NO. : 6,813,399 B2
DATED : November 2, 2004
INVENTOR(S) : Hamada

It is certified that error appears in the above-identified patent and that said Letters Patent is hereby corrected as shown below:

Title page,
Item [56], References Cited, U.S. PATENT DOCUMENTS,
"2003/016787   A1   9/2003   Aldaz et al." should read
-- 2003/0169787   A1   9/2003   Vurgaftman et al. --.

Column 21,
Line 18, "vector $k_1$, and" should read -- vector $k_1$ and --.

Column 25,
Line 21, "$\beta_2$" should read -- $\beta_1$ --.

Column 26,
Line 46, "$\alpha_1$, and" should read -- $\alpha_1$ and --.

Signed and Sealed this

Eleventh Day of October, 2005

JON W. DUDAS
*Director of the United States Patent and Trademark Office*